Oct. 12, 1954   L. JOHNSTON ET AL   2,691,342
ELECTRICALLY OPERATED TICKET ISSUING MACHINE
Filed April 20, 1948   13 Sheets-Sheet 2
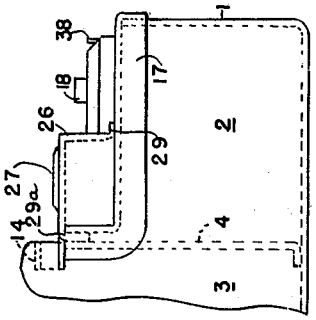
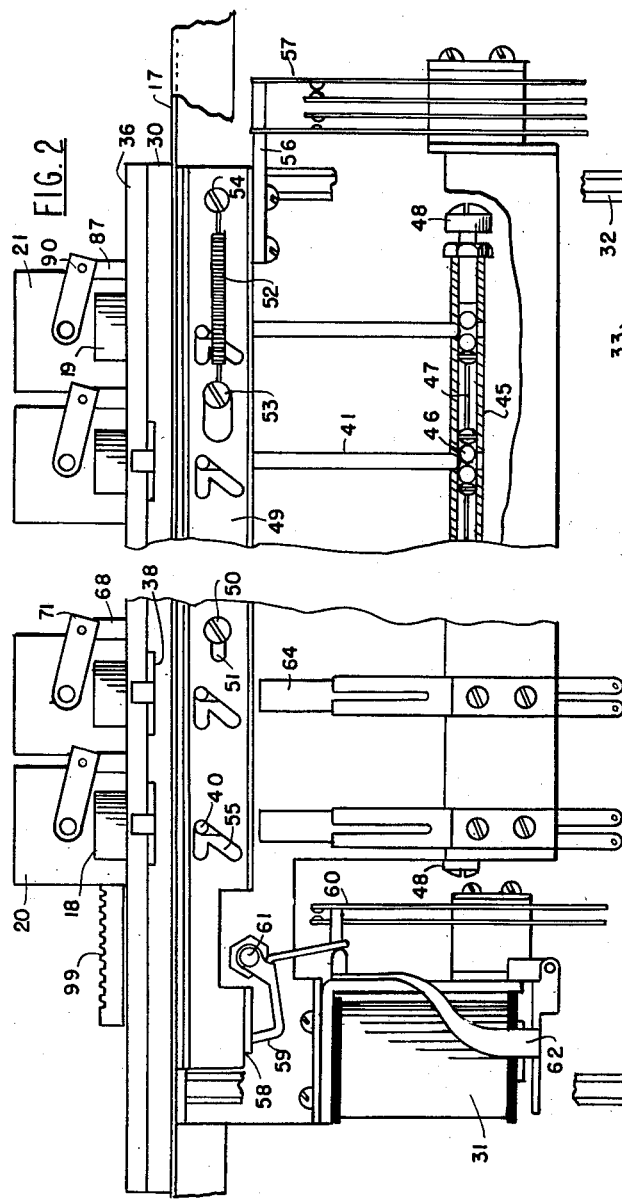
INVENTORS.
LEITH JOHNSTON
EDWIN C. COULOMBE JR.
BY
ATTORNEY Oct. 12, 1954 L. JOHNSTON ET AL 2,691,342
ELECTRICALLY OPERATED TICKET ISSUING MACHINE
Filed April 20, 1948 13 Sheets-Sheet 3
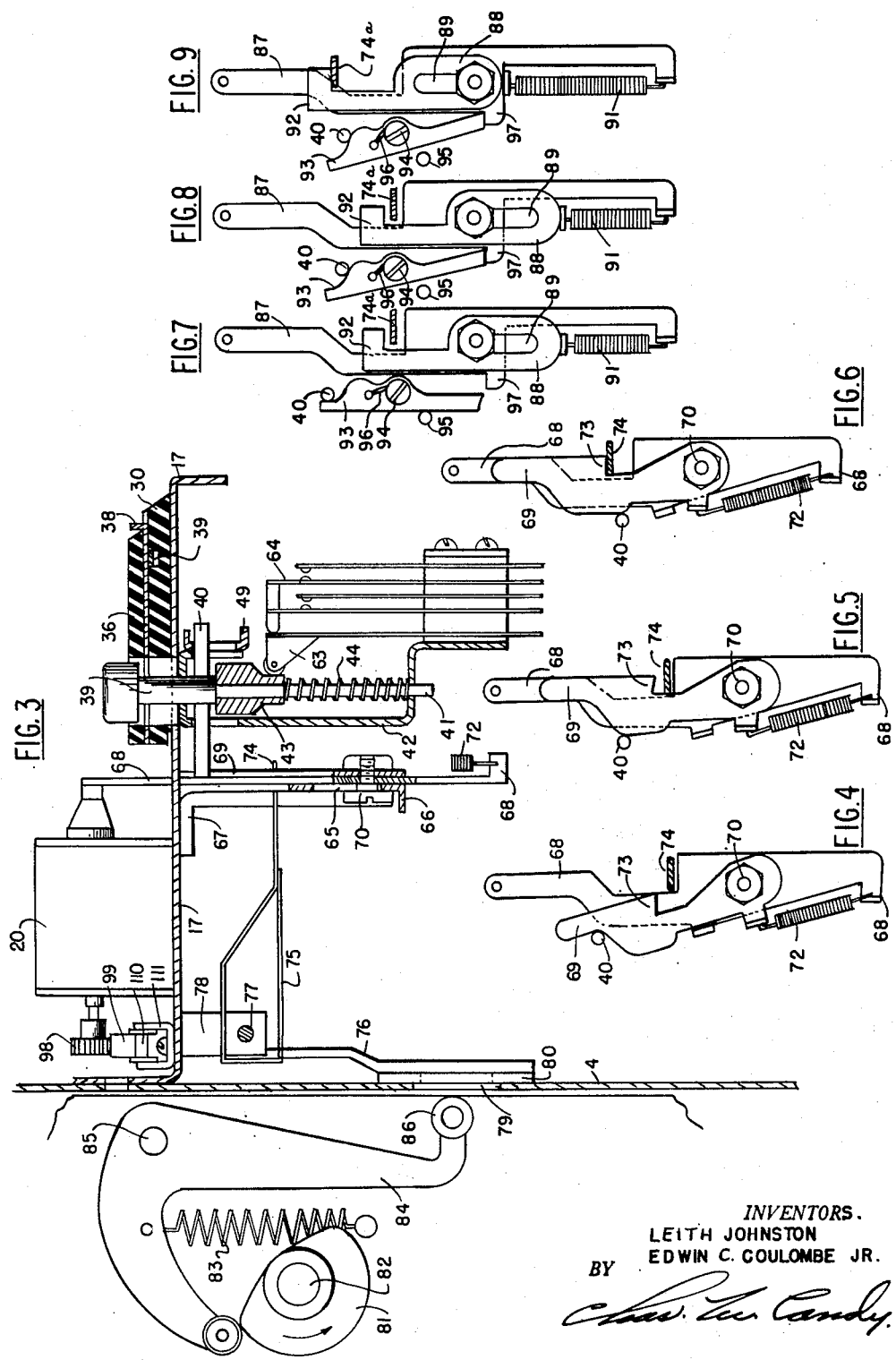
INVENTORS.
LEITH JOHNSTON
EDWIN C. COULOMBE JR.
BY Oct. 12, 1954     L. JOHNSTON ET AL     2,691,342

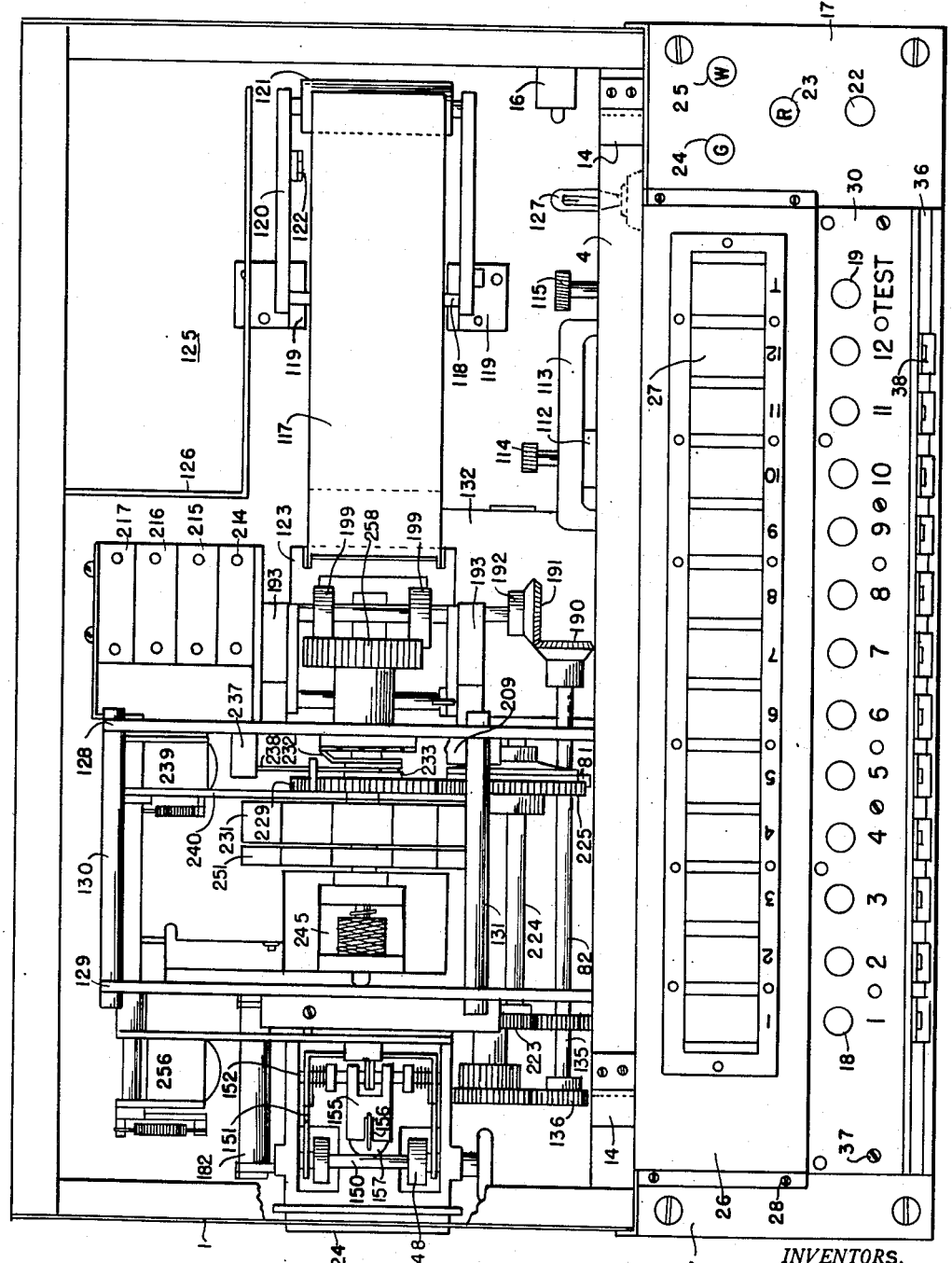

ELECTRICALLY OPERATED TICKET ISSUING MACHINE

Filed April 20, 1948     13 Sheets-Sheet 4

INVENTORS.
LEITH JOHNSTON
EDWIN C. COULOMBE JR.
BY

ATTORNEY

Oct. 12, 1954  L. JOHNSTON ET AL  2,691,342
ELECTRICALLY OPERATED TICKET ISSUING MACHINE
Filed April 20, 1948  13 Sheets-Sheet 5

*INVENTORS.*
LEITH JOHNSTON
EDWIN C. COULOMBE JR.
BY
ATTORNEY

Oct. 12, 1954  L. JOHNSTON ET AL  2,691,342
ELECTRICALLY OPERATED TICKET ISSUING MACHINE
Filed April 20, 1948  13 Sheets-Sheet 6

INVENTORS.
LEITH JOHNSTON
EDWIN C. COULOMBE JR.
BY

ATTORNEY

Oct. 12, 1954   L. JOHNSTON ET AL   2,691,342
ELECTRICALLY OPERATED TICKET ISSUING MACHINE
Filed April 20, 1948   13 Sheets-Sheet 7

INVENTORS.
LEITH JOHNSTON
EDWIN C. COULOMBE JR.
BY

ATTORNEY

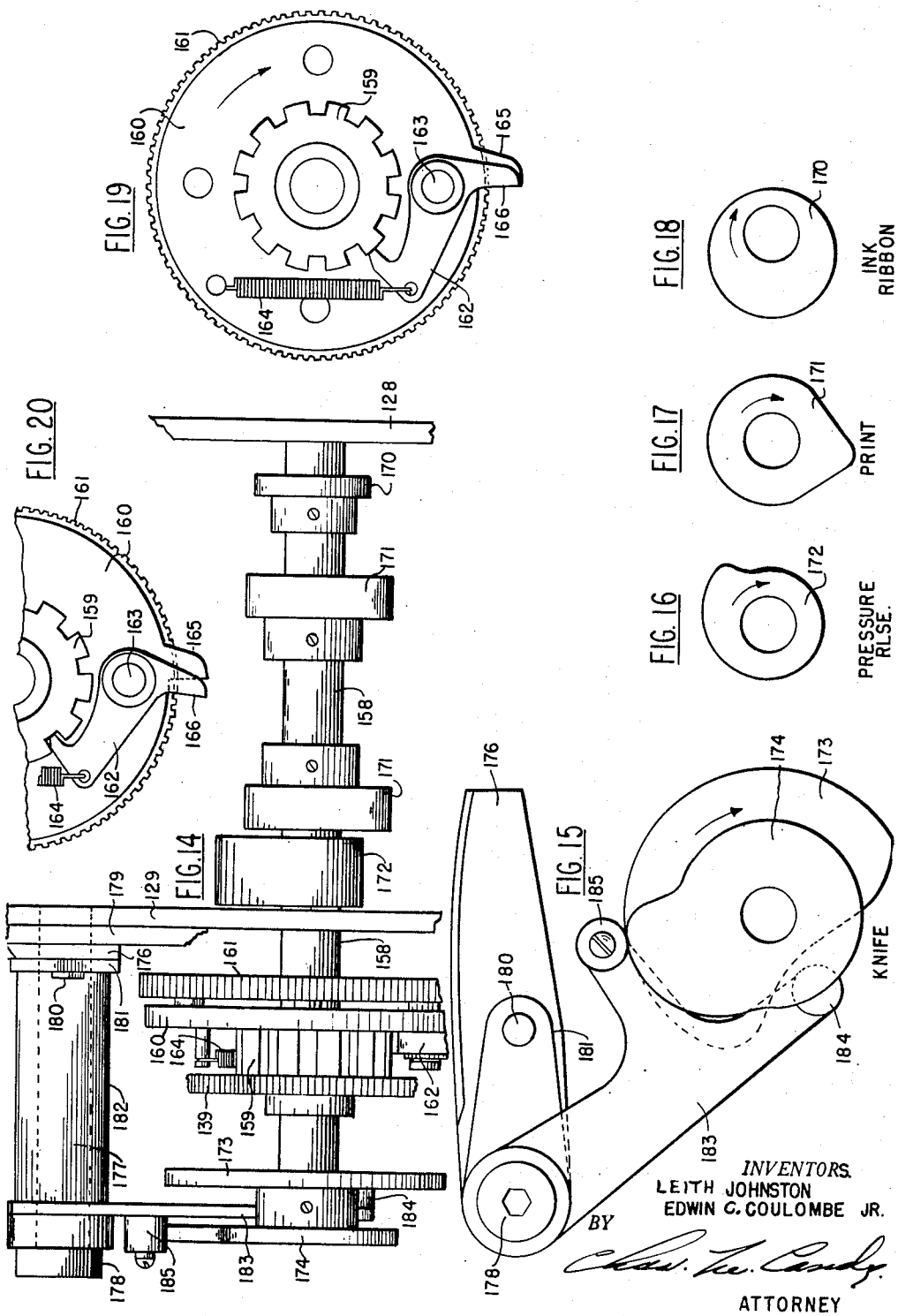

Oct. 12, 1954
L. JOHNSTON ET AL
2,691,342
ELECTRICALLY OPERATED TICKET ISSUING MACHINE
Filed April 20, 1948
13 Sheets-Sheet 9
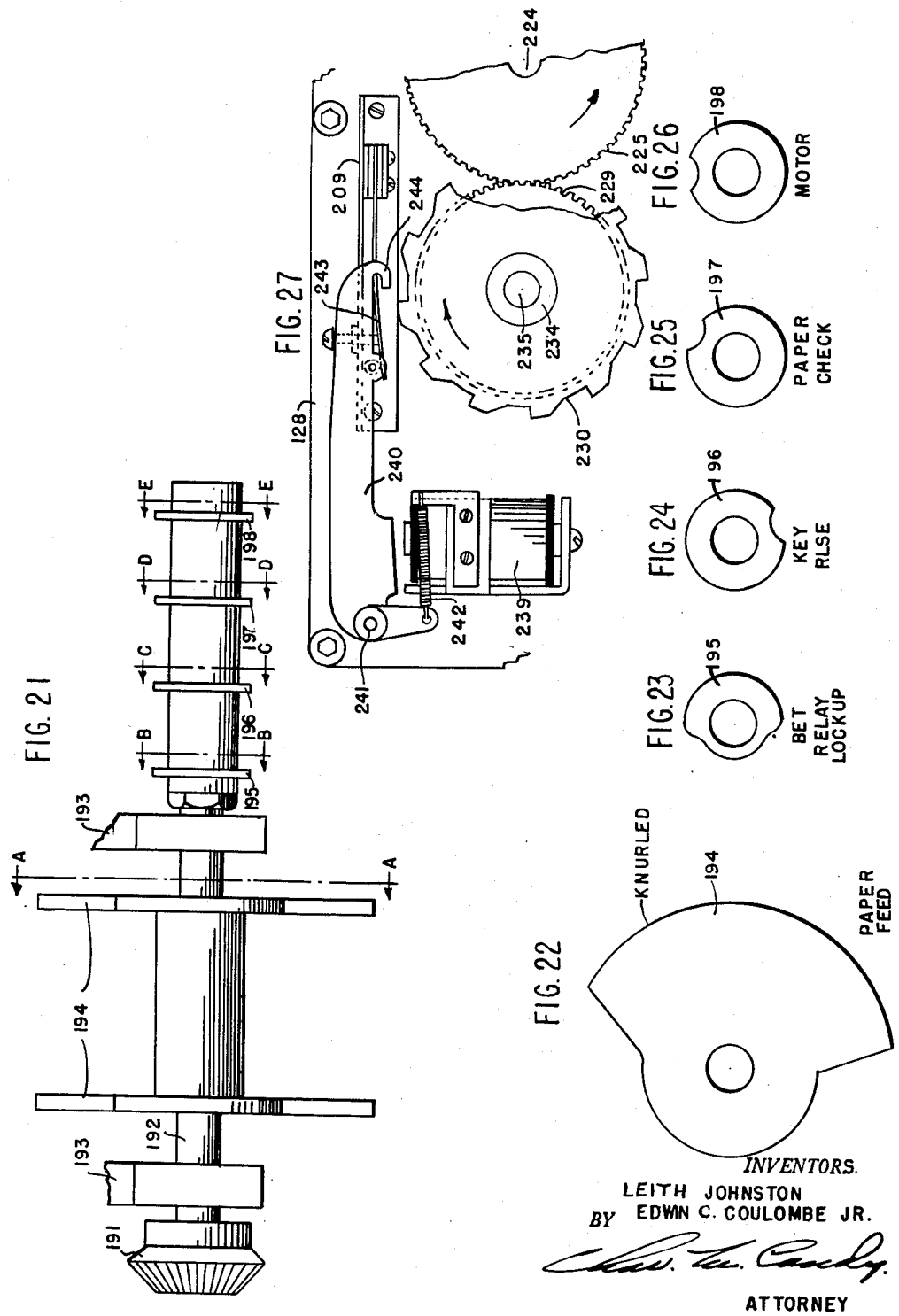
INVENTORS.
LEITH JOHNSTON
EDWIN C. COULOMBE JR.
BY
ATTORNEY

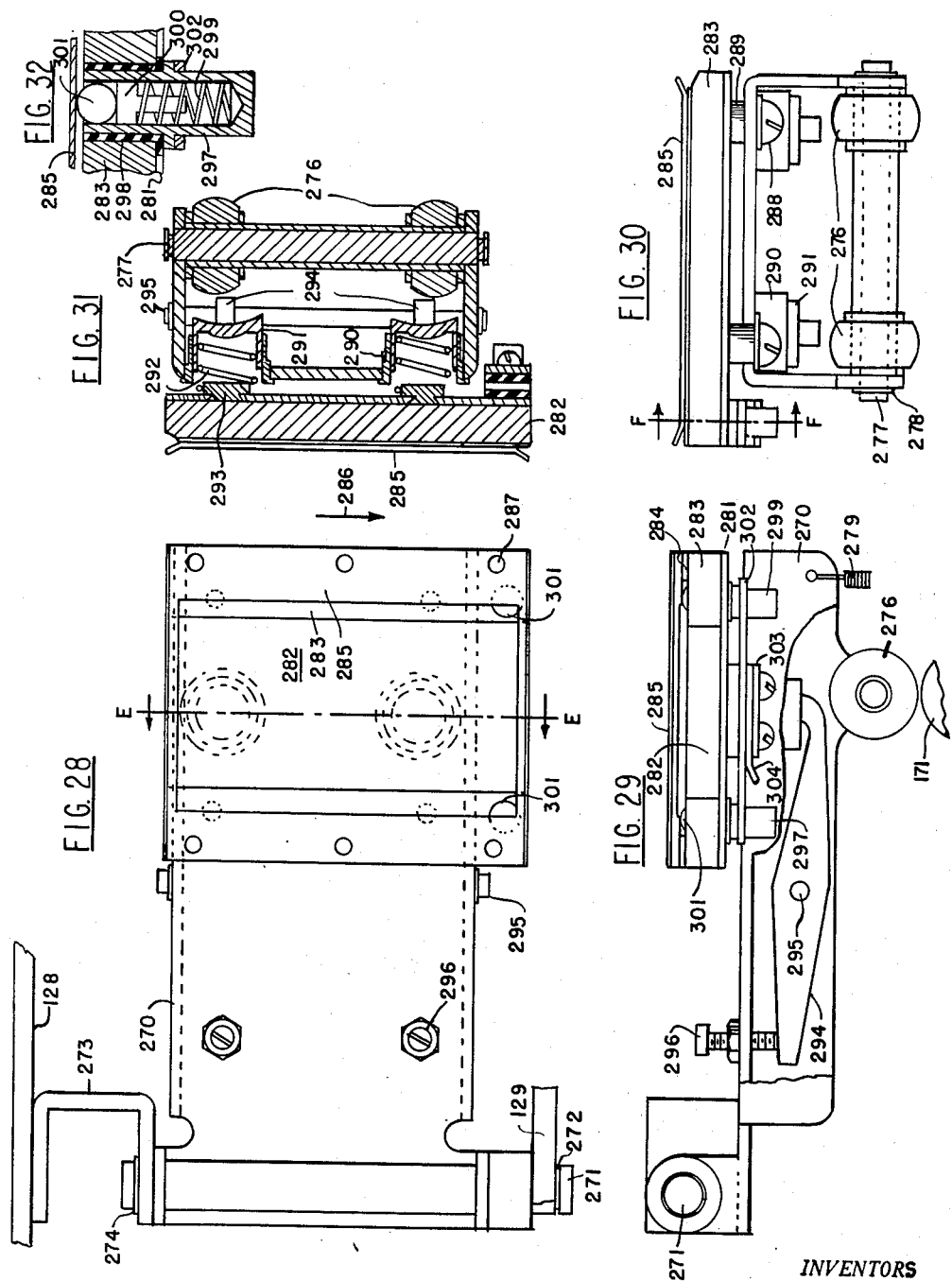

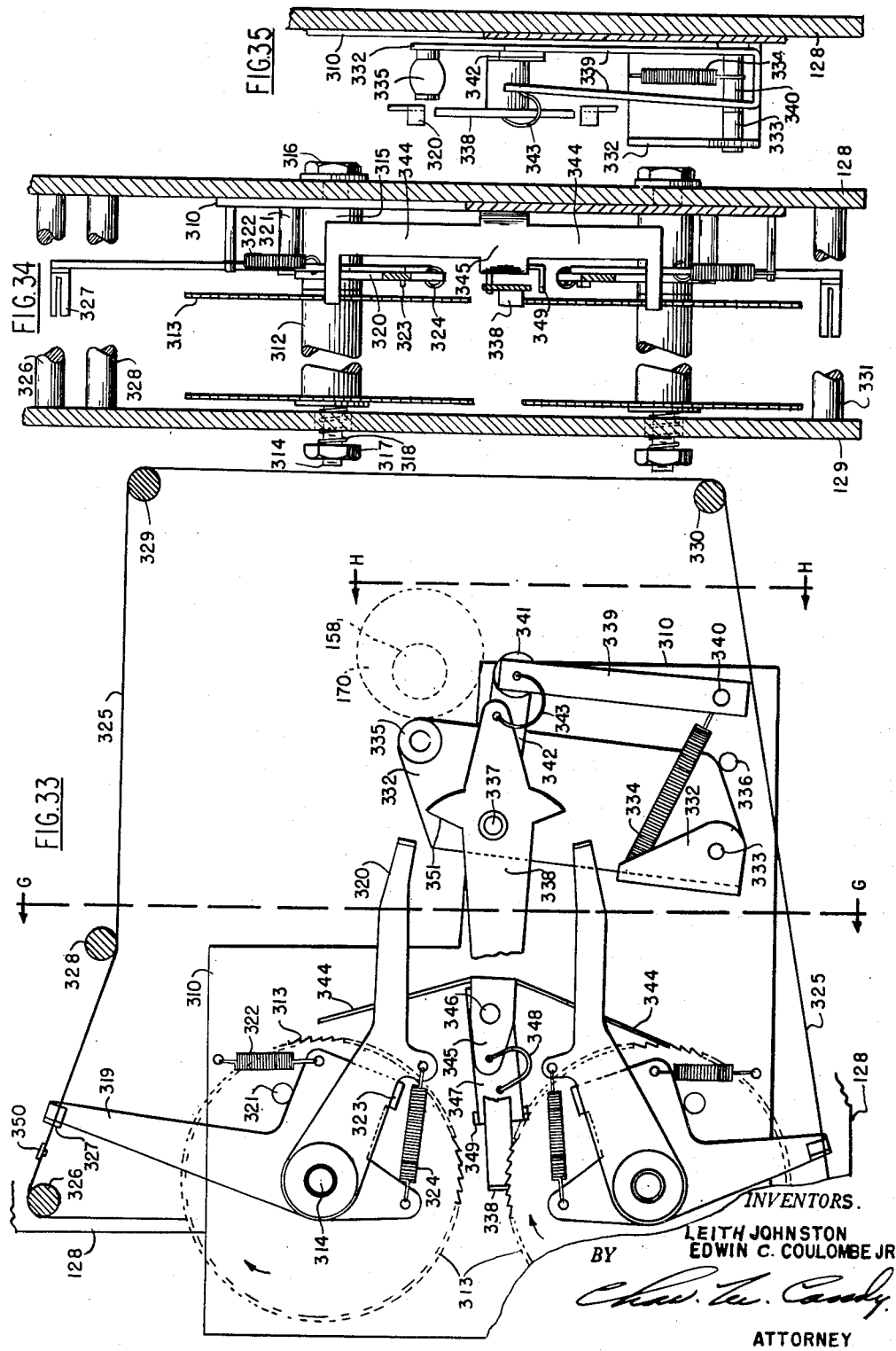

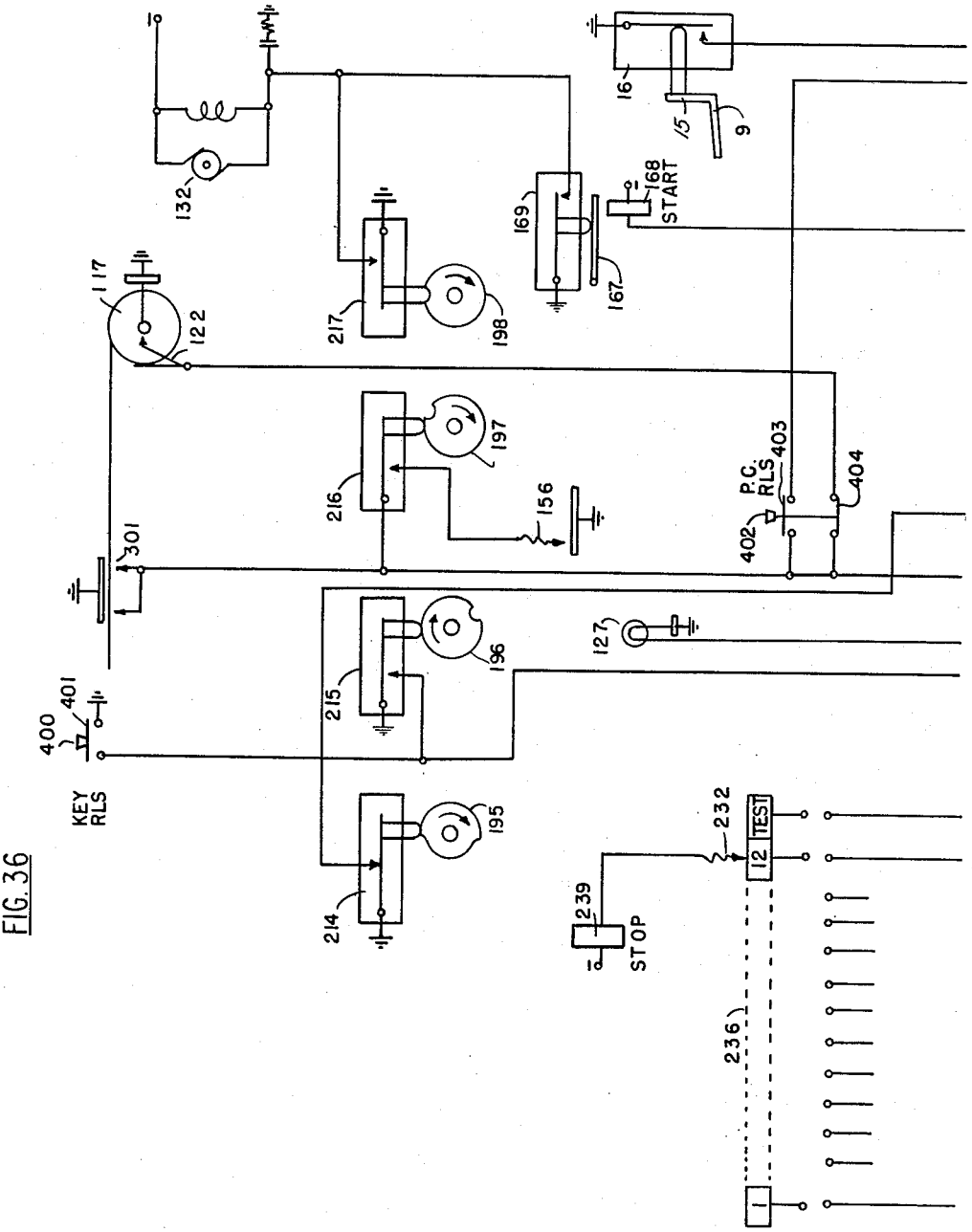

Oct. 12, 1954  L. JOHNSTON ET AL  2,691,342
ELECTRICALLY OPERATED TICKET ISSUING MACHINE
Filed April 20, 1948  13 Sheets-Sheet 13

FIG. 37

INVENTORS.
LEITH JOHNSTON
EDWIN C. COULOMBE JR
BY
*Chas. Wm. Cardy*
ATTORNEY

Patented Oct. 12, 1954

2,691,342

UNITED STATES PATENT OFFICE 2,691,342

ELECTRICALLY OPERATED TICKET ISSUING MACHINE

Leith Johnston, Chicago, and Edwin C. Coulombe, Jr., Elgin, Ill., assignors to Automatic Electric Laboratories, Inc., Chicago, Ill., a corporation of Delaware Application April 20, 1948, Serial No. 22,144

12 Claims. (Cl. 101—66)

This invention relates in general to ticket issuing machines, and particularly to an electrically controlled machine of this type for use with a race track totalisator system in which a separate ticket issuing machine is used for each value of ticket and each pool.

This machine prints, counts, cuts off, and ejects the tickets one at a time, in response to the operation of any one of a plurality of electrical push keys which form a part of the machine. The ticket paper is stored in the machine, in the form of a large roll of special paper having the pool data pre-printed thereon, preferably along the outer edges, leaving the central portion blank. The data to be printed on the tickets by the machine comprise the runner number, the race number, the track name, the denomination of the ticket, the date, and a secret code name or number, ordinarily changed just before each event as a precaution against forgeries. The runner numbers are on a rotatable type wheel, electrically controlled from the keys, while the race numbers are on a similar wheel mounted on the same shaft, and electrically controlled from the totalisator control room. The date and code word are changeable by hand after the machine has been unlocked and opened, by an authorized person.

The main object of our invention is to provide a machine of this type, which will be fast in operation, yet simple and rugged and easy to maintain, with electrical controls wherever possible, to eliminate the use of long mechanical levers and linkages, which are often a source of trouble.

Another object of the invention is the provision of means for the exclusion of dust, both external and internal, from the various electrical contacts, in order to prevent possible open circuits from this cause.

One feature of the invention is accordingly the provision of means for releasing the operated runner select key shortly after the mid-point of the operating cycle, as soon as printing has occurred, and means whereby an immediate re-operation of the keys will cause the machine to actuate a new cycle without stopping, and thus speed up the operation.

Another feature of the invention is the provision of mechanically detached moving parts wherever possible, and the construction of the keyset and printing mechanisms as separate detachable units, in order to facilitate removal and replacement of these parts and their sub-assemblies.

A further feature of the invention is the provision of a substantially dust tight compartment in the front of the housing for the keyset unit, which has the relays used in the circuit mounted on the underside thereof, and the counters on the upper side, and means for the mechanical operation of these counters through said compartment, under the joint control of the keys and the printing unit, without any permanent connection between them.

Another feature is the use of a start-stop-run, electrically controlled, friction driven runner-number type wheel, which is started at the beginning of the operating cycle, is stopped for printing, and continues to rotate after printing until the completion of the operating cycle.

Still another feature is the use of a cam-driven rocking printing platen, with adjustable tension and a built-in electrical paper check.

Another feature is the provision of a simple cam-and-pawl drive ink-ribbon reversing mechanism which is entirely automatic.

Still another feature is the provision of a two-way electrical paper check in the exit chute, operative in case of either a feeding failure or a paper jam at this point.

Other objects and features of the invention will be apparent from the description and claims which follow, when considered in conjunction with the appended drawings comprising Figures 1 to 37 inclusive, which show one embodiment of the invention, Figure 1 being the overall assembly, while Figures 2 to 9 show the keyset unit, Figures 10 to 35 the printing unit, and Figures 36 and 37 the circuit.

Figure 1 is a plan view of the complete machine with the top cover removed.

Figure 1a is a front elevation of the right end of the top cover in closed position, with a portion broken away to show the cover locking arrangement.

Figure 2 is a front elevation of the keyset unit, with certain portions broken away, a portion shown in cross section, and the counter cover removed.

Figure 2a is an end view of the front part of the housing with the keyset in place and certain lines shown dotted to indicate the compartmentation.

Figure 3 is a partial cross sectional view of the upper part of the keyset unit as seen from the left end, at the approximate location of the third runner key, together with a portion of the printing unit, to show certain details of the key and counter operation.

Figures 4, 5 and 6 show the runner key control of the runner counters, in three steps.

Figures 7, 8 and 9 show similarly how the operation of the total counter is blocked when the test key is operated.

Figure 14 is a side view of the main cam shaft, which controls the printing, cutting and ink-ribbon-feed operations, seen from the front.

Figure 15 is an end view of the ticket cutting knife and its controlling cams, and Figures 16, 17 and 18 are similar views of the other cams on the same shaft, seen from the left, in normal position.

Figure 19 is an end view of the pawl and ratchet clutch used for driving the main cam shaft, shown in the normal position, while Figure 20 shows a portion of the same view with the pawl in the engaged or driving position, seen from the left.

Figure 21 is a side view of the paper-feed cam shaft as seen from the right-side of the printing unit, while Figures 22 to 26 inclusive, show the individual cams mounted on this shaft, in outline, as seen from the right end of the shaft, while in normal position.

Figure 27 shows the runner-wheel stopping mechanism, in a detached view as seen from the left side of the machine, with all intervening equipment removed.

Figure 10:
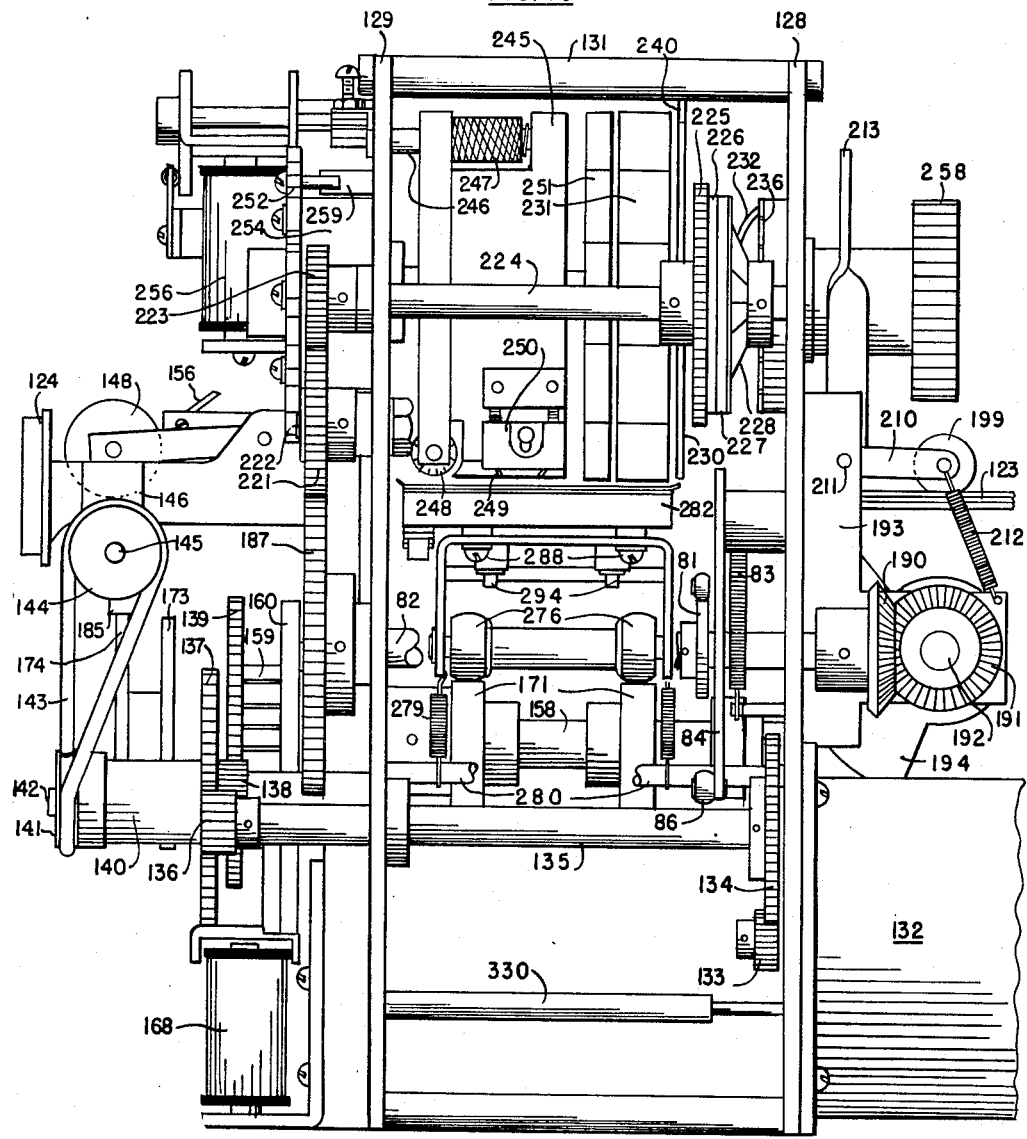
Figures 10 and 11 show front and rear elevations respectively of the printing unit, with certain parts, such as the ink ribbon reversing mechanism, omitted or broken away.

Figure 28 is a top view of the printing platen; Figure 29 is a side view, seen from the left; and Figure 30 is an end view, as seen from the front. Figure 31 is a cross section view of Figure 28 taken at EE, and Figure 32 is a cross section of Figure 30 taken at FF.

Figure 33 is a side view of the ink-ribbon feed mechanism seen from the left, with the driving cam and ribbon guide posts indicated in their proper relative positions, and less the reels, whose outlines however are indicated by dotted lines.

Figure 34 is a cross-sectional view of the ink-ribbon feed mechanism taken along the line GG, as seen from the front, while Figure 35 is a similar cross sectional view of a portion of this mechanism along the line HH, with the driving cam omitted in both cases.

Finally, Figure 36 shows the circuit of the printing unit, while Figure 37 shows the circuit for the keyset unit, together with a portion of the totalisator control room circuits, in simplified form.

The embodiment of the machine thus illustrated may be seen to consist of a housing 1, having a front compartment 2 for the keyset unit, a rear compartment 3 for the printing unit, and an intervening wall 4 separating the two compartments (Figs. 1 and 2a). The rear compartment is provided with an overlapping cover 5 (Fig. 1a) hinged at the rear, and having a sloping portion in the front provided with a transparent window 6.

On the right hand side of the front face of the cover 5 is a lock 7 having a pivoted member 8 on the back thereof which may be turned in a clockwise direction by means of a key inserted in the lock from the front. Also on the back of the front face of the cover, to the left of the member 8, is a long cover-locking bar 9, slidably mounted in retaining guides 10, and normally held to the right by a spiral spring 11. The bar 9 has a locking lug such as 12 at each end thereof on the under side, in such a location that when the cover is moved from the open to the closed position, the sloping edges 13 of the locking lugs 12 strike against the left edges of a pair of S-shaped latching brackets 14 mounted on the flat top edge of the partition 4. The locking bar 9 is thus forced to the left until the nose of each locking lug has cleared the under side of its latching bracket, whereupon the bar 9 is pulled to the right by the spring 11 and locks the cover closed. In this position the right end 15 of the bar 9, bent backward at right angles, bears against the operating plunger of the sealed-in snap-action switch 16 mounted on the right side of the housing, and opens a pair of electrical contacts inside the snap switch. To open the machine, it is necessary to insert a key in the lock 7, turn the key, and raise the cover. Turning the key to the right causes the member 8 to force the bar 9 to the left to free the locking lugs and close the contacts 16. If the key is released without lifting the cover however, the spring 11 will restore the bar 9 to locking position and open the contacts 16. Thus, whenever the key is turned in the lock, or the cover is raised, the contacts 16 will be closed, and will light an individual warning signal, such as lamp 599 in Fig. 37, in the control room so that the open condition of any machine or any attempt to open such machine is made known there immediately.

The keyset unit, as shown in Figures 1, 2, 2a and 3, as well as Figures 4 to 9, consists of an overlapping L-shaped cover plate 17 (Fig. 2a) mounting a row of thirteen interlocking push keys (Fig. 1) including twelve runner keys 18 and a test key 19, a row of thirteen counters, including twelve runner counters 20 and a total counter 21, and on the right, a single non-locking push-type trouble key 22, together with a paper check lamp 23, a bet lamp 24, and a start lamp 25, the last four items being used to help determine the nature of a stoppage, in case of trouble. The counters are provided with a common cover 26 having a transparent window 27 in the top, and held in place by screws 28 and by a lip 29 clamped down by the key plate. (Figs. 1 and 2a.) The rear side of this cover is made in the form of a shallow downturned lip 29a insertable between the wall 4 and the upturned rear edge face of the cover plate 17, so that when the main cover 5 is closed, it rests on the upper side of this lip. Removal of the counter cover thus requires both the opening of the main cover, and the removal of the key plates. On the under side of the cover plate 17, are the key springs and locking mechanisms, the counter operating mechanism, and the key release magnet 31. Suspended below the key mechanism on posts 32, is an angle bracket 33, mounting five relays, and a jack 35 which engages a corresponding jack not shown, mounted on the bottom of the keyset compartment.

The key plate which is mounted on top of the cover plate to serve as a guide for the heads of the runner and test keys, consists of a base plate 30 and a top plate 36 made of insulating material, riveted together, and mounted on the cover plate by means of screws 37 (Fig. 1). Slidably mounted in transverse grooves in the upper face of the base plate 30 in line with the runner keys, are twelve "scratch" bars 38, each having a large hole near the rear end, to permit passage of the head of the key. To prevent inadvertent or accidental operation of a key corresponding to a non-participating or withdrawn runner, the corresponding scratch bar is withdrawn until the rear side of the hole in the bar strikes the shank of the key, thereby physically blocking the depression of such key. A formed flat spring 38, mounted in a longitudinal groove in the base plate 30, tends to hold the bars 33 in their last operated position (Fig. 3).

With reference to the select keys, each of these keys, as shown in Figure 3, consists of a head and shank 39 into which are inserted a transverse pin 40 and a stem or spindle 41, the said shank and spindle being supported in guide holes at the top and bottom of a mounting bracket 42. Mounted on the upper part of the spindle are a cam body 43 and a restoring spring 44. The lower end of each spindle (Fig. 2) is arranged to pass through holes in the upper side of a tube 45 opposite similar holes in the underside. Inside the tube, opposite each spindle, is a pair of small balls 46 held in position by spacing members 47 and adjusting screws 48 at the ends of the tube 45 in such a way, that the movement of the parts 46 and 47 is limited to the width of one spindle. Thus when any select key (including the test key) is operated, the passage of its spindle through the tube forces all of the parts 46 and 47 tightly together so as to completely prevent the operation of more than one select key at a time.

A sliding bar 49 is mounted on the upper end of the key bracket 42 by means of shoulder screws 50 riding in slots 51 in the bar, which is normally held to the left by the spiral spring 52, which is anchored to the key bracket by the screw topped post 53, and to the bar by the post 54. The bar 49 is provided with openings 55 each resembling an upright figure "7," in positions corresponding to the various keys, such that the pin 40 of each key normally rests in the apex of the angle of the corresponding opening 55. At the right end of the bar 49 is a projection 56 arranged to operate the contact springs 57 when the bar is moved to the right. On the left end of the bar is a notch 58 into which one arm of a bell crank 59 is forced by the tension of a contact set 60 whenever the bar is operated to the right. The upper arm of the bell crank, which is pivoted at 61, thereupon locks the bar in its operated position, while the lower arm permits closure of the contacts 60.

Whenever any select key is operated, its pin 40 is pressed vertically downwards against the sloping lower edge of the corresponding opening 55, forcing the bar 49 to the right as stated, and operating the contact sets 57 and 60, the latter starting the printing unit, in a manner to be described later. As the bar 49 moves to the right, the pins 40 of the remaining keys engage the horizontal upper arms of the corresponding openings 55, which prevents the operation of any other key at this time, and guards against any attempt to force their spindles against the locking members of the tube 45. The downward movement of the key also forces the cam body 43 against a roller equipped cam follower 63 for operating the associated contact set 64, which controls the runner selection in a manner to be described later.

The counter operating mechanism, shown in detail in Figs. 3 to 9 consists of a series of runner counter operating links such as shown in Figure 4, slidably mounted behind the keys in vertical slots 65 in a long horizontal guide bar 66, mounted on end brackets 67 by screws not shown. Each of these operating links consists of a trigger arm 68 carrying a pawl 69 pivoted thereon by a shoulder screw and nut assembly 70 which serves to hold each link loosely against the guide bar 66 through the slots 65. Each trigger arm 68 is fastened at its upper extremity to the crank 71 of the associated counter, while a coiled spring 72 fastened to the lower ends of the arm 68 and the pawl 69 serves the double purpose of operably linking the two parts together, and at the same time forcing the pawl 69 in an anticlockwise direction against a rearward extension of the pin 40 on the associated runner key.

In the normal position of the pawl 69 the shoulder 73 thereof is held out of the path of the associated lifting tine 74. When however, a runner key is depressed, the rearward extension of its pin 40 forces the pawl 69 in a clockwise direction to bring the shoulder 73 into the path of the associated lifting tine 74, as shown in Figure 5. The tines 74, one of each counter, are punched out from the long side of a lift bar 75 which, with the control arm 76 to which it is rigidly secured, forms a common operating bail pivoted at 77 in end blocks 78. The weight of the lift bar 75, which is considerably greater than that of the arm 76 due to its length, suffices to hold the end of the arm 76 firmly against a small window 79 cut in the wall 4 between the keyset and printing unit compartments. This window is covered with felt, slit vertically and horizontally. The wall side of the arm 76 is also faced at its lower end with four spaced apart strips of felt 80, outlining the window at the point of contact therewith, so as to maintain a normally dust tight seal between the two compartments.

As soon as the printing unit starts its operation as the result of the key operation, the cam 81 mounted on the shaft 82 of the printing unit, starts to rotate in the direction of the arrow. The rotation of the cam plus the action of the spring 83, causes the rocker arm 84 pivoted at 85, to immediately start turning in an anticlockwise direction, forcing the roller 86 to the right through the window 79 against the arm 76. The arms 76 and 75 of the counter operating bail are thus also turned in an anticlockwise direction lifting the tines 74. The pawl 69 of the counter operating link associated with the operated runner key is thereupon lifted by the engaged tine 74 and by the action of the spring 72 lifts the associated trigger arm 68, as shown in Figure 6, thereby operating the counter. After about ¼ revolution the cam 81 starts the reverse movement of the rocker arm to complete the operation, the roller 86 being completely withdrawn to its own side of the wall 4 before the cam 81 has completed a half revolution, and before the printing and cutting operations have taken place.

The operating link for the total counter is generally similar to the runner counter links, but with certain slight differences required to cause this counter to operate when any runner key is operated, but not to operate when the test key is operated. This link, as shown in Figure 7, consists of a trigger arm 87 carrying a pawl 88 held in an upright position thereon by the usual shoulder screw and nut assembly, which serves to hold the link loosely against the guide bar 66 opposite the test key, through one of the slots 65 in the guide bar, and a slot 89 in the pawl 88. The upper end of the trigger arm 87 is connected to the operating crank 90 of the total counter (Fig. 2), while the lower ends of the trigger arm and pawl are operably interconnected by a coiled spring 91, which also serves to hold the pawl 88 in an upright position on the trigger arm, so that the shoulder 92 is always in the path of the associated lifting tine 74a. The total counter is thus operated whenever any runner counter is operated, through the action of the common lift bar 75, to register the total number of tickets issued by the machine, on all runners.

Whenever the test key is operated however, to cause the machine to issue a test ticket, the rearward extension of the pin 40 on the test key is pressed downward against a sloping shoulder of a blocking lever 93. This blocking lever, which is pivoted at 94, is normally held in an upright position, against a back stop 95 as shown in Figure 7, by means of a small coiled spring 96. Upon the operation of the test key, the pin 40 causes the lever 93 to turn in an anticlockwise direction, to bring the lower end thereof into the path of the shoulder 97 on the trigger arm 87, as shown in Figure 8. Accordingly, when the printing unit turns over in response to the operation of the test key, the tine 74a lifts the pawl 92 as usual, as shown in Figure 9, but this now only results in the extension of the spring 91, the trigger arm 87 being prevented from moving by the lever 93. The lifting tines 74 are also raised by the lift bar 75, but are also without effect, since no runner key is operated. Thus the operation of the test key prevents the operation of any of the counters.

For restoring the runner counters to normal, a toothed wheel 98 is provided on the rear end of the shaft of each of said counters, where it engages the toothed side of a long rack 99 mounted on a series of rollers 110 (Fig. 3), set in the open side of an inverted channel 111, fastened to the upper side of the cover plate 17. This rack is manually controlled by a long lever 112 (Fig. 1) pivotally mounted on the rear side of the dividing wall 4, near the bottom and movable from left to right and back again in the guide 113 by means of the top end of said lever which projects above the top of the wall. A slidably mounted pin 114 carried by the lever 112 is arranged to engage a slot in the rack through a horizontal, slit felt-covered window, not shown, in the wall 4, and a corresponding opening in the rear edge of the cover plate 17. The pin 114 is normally held in the engaged position by means of a cotter pin, not shown. This cotter pin is removed and the pin disengaged by pulling it toward the rear, when it is desired to remove the keyset unit from the housing. To restore the counters to zero it is only necessary to move the lever 112 to its extreme left position and then back to the right. On the movement of the lever and rack to the left, the wheels 98 run free but on the movement to the right an internal arrangement in the counters is operated, to reset all of the number wheels to zero.

The total counter is reset separately as necessary, by means of a pin 115 (Fig. 1) slidably and rotatably mounted in guide bearings, not shown, on the rear side of the partition 4. This pin 115 is normally spring pressed to its rearmost position, but on being pressed forward, its tip passes through another slit felt-covered opening in the upper part of the wall 4, and engages a keyway in the end of the reset shaft of the total counter, which may then be reset by turning the knurled head of the pin 115 manually. When the pin is released it pulls clear unaided.

With reference to the arrangement of the equipment in the rear compartment, as shown in Figure 1, the printing unit, shown at the left, is held in place by heavy screws not shown, from the under side of the housing. It is readily removable as a unit by loosening these screws and disconnecting a multi-point detachable cable connector 116 shown in Figures 11 and 12, the wires for the free end of which are brought in through sealed cable entrances not shown, in the housing.

At the right of the printing unit in Figure 1, is a roll of ticket paper 117 rotatably mounted on a spindle 118 held loosely in transverse slots cut in the top end of support brackets 119 mounted on the bottom of the box. Pivotally mounted on the bottom end of the brackets 119 are a pair of side brackets 120 carrying at their outward extremity a roller 121, spring-pressed by springs not shown against the under side of the roll of ticket paper. As the roll is used up, the roller 121 rises gradually until, when the paper is almost exhausted, a wire contact 122 carried by the bracket 120 strikes the grounded upright 119 and closes electrical circuits to prevent further operation of the machine, in a manner to be described later, and to light the paper check lamp 23. The paper is fed into the printing unit through the entrance chute 123, while the printed tickets are ejected through an exit or ticket chute 124.

To the rear of the paper reel 117, in the rear part of the housing, is a storage compartment 125 surrounded by a wall 126 which provides space adequate for storing two extra rolls of ticket paper. In front of the paper reel 117 is a lamp 127 mounted on the wall 4, which lights whenever the trouble key 22 is operated, to illuminate the inside of the machine, which may then be seen through the window 6 in the cover.

With reference to the construction of the printing unit, this device is mounted on two flat walls 128 and 129 running from front to rear in parallel planes, and held together by spacer posts, such as indicated at 130 and 131 (Fig. 1). A motor 132 mounted on the right side of the wall 128 at the bottom front corner is arranged by means of a pinion 133 and a gear 134 (Fig. 10), to drive a main shaft 135 mounted in suitable bearings in the walls 128 and 129. A pinion 136, on the far end of this shaft, beyond the wall 129, is similarly arranged to drive a gear 137, which in turn, is arranged to drive a gear 139, through the pinion 138.

The gear wheel 137 is also rigidly secured to a hollow shaft 140 carrying a small pulley 141, the complete assembly rotatably mounted on a fixed shaft 142 anchored, at its inner end, in the wall 129. The pulley 141 in turn, is arranged to drive, by means of a belt 143, a second pulley 144, rigidly secured to a shaft 145, rotatably mounted just below the ticket chute 124, in side lugs 146 which form a part of the chute. Also rigidly secured to the shaft 145 are a pair of rubber-shod feed rollers 147 (Fig. 13) projecting upward into the inside of the chute through openings on the bottom thereof, to meet a pair of idler rollers 148 projecting downward through other openings in the roof of the chute. Thus, when the motor is operating, and there is no ticket in the chute, the rollers 147 will drive the idler rollers 148 without effect, but when a ticket has been fed forward onto the bed 149 of the chute following the printing operation and is cut off, the rollers 147 eject the ticket from the chute, while the motor is coasting to a stop, at the end of the operating cycle.

The ticket-chute idler rollers 148 are mounted on a shaft 150 held between the tips of the long legs of a pair of U-shaped brackets 151 (Figs. 1 and 11), each having a long and a short leg, the short legs being adjacent each other to form a central bearing for a pivotal shaft 152 rigidly secured to side lugs 153 on the upper side of the ticket chute. The rollers 148 are pressed in a downward direction by coiled springs 154 on the shaft 152 on either side, one end of which bears down on the long arm of each bracket 151.

Also mounted on the pivotal shaft 152, in the center thereof, is a small rectangular block 155 made of insulating material, and carrying rigidly secured in a slot cut in the free end thereof, a wired flexible contact brush or wiper 156, which projects downward through an opening 157 (Fig. 1) in the top of the chute, to make contact with the grounded bed of the chute. A slot in the pivoted end of the block 155 provides clearance for the entry of the short legs of the U brackets 151. A slight clearance is provided between the ends of these short legs and the bottom of the slot, so as to permit a slight up and down movement of either the brush 156 or the idler rollers 148 independently of each other. A large movement of either member however, will cause a corresponding movement of the other. Normally, since the brush carrier 155 fits somewhat loosely on the rod 152, the brush 156 bears against the bottom of the chute by the force of gravity alone, in the illustrated embodiment, although light spring tension could be readily applied to the block 155 if desired.

The brush 156 is connected in series with a cam controlled contact on the printing unit which is closed only momentarily during the operating cycle of the machine, while the ticket is being fed forward into the chute, just before it is cut off. If at that instant, the ticket is between the brush 156 and the bed of the chute as it should be, nothing happens, but if it is not, the brush completes an electrical circuit which prevents further operation of the machine, in a manner to be described later in connection with the circuits. Similarly, any paper jam in the chute which raises the brush 156 considerably above the thickness of a ticket will ground the brush 156 against the left end of the slot 157, again locking up the machine. The brush 156 is held in the block 155 from the side by means of a set screw, and is thus readily adjustable.

The main driving gear 139, which is freely rotatable about the shaft 158, is arranged to drive a number of cam shafts and a runner-number type-wheel by means of a pawl and ratchet clutch controlled by an electromagnet. Accordingly, a toothed drum or ratchet 159 is rigidly secured to the gear 139 and revolves with it. Next to the ratchet 159 to the right thereof on the shaft 158 is a circular plate 160 (Figs. 14, 19 and 20) which is rigidly secured to the shaft and to another gear wheel 161. Also mounted on the plate 160, on the left face, is a pawl 162 pivoted at 163, whose nose is spring pressed toward the ratchet 159 by a coiled spring 164.

In the normal position of the shaft 158, a projection 165 on the disc 160 and a tail 166 on the pawl 162 are engaged by the armature 167 (Fig. 13) of a start magnet 168 mounted on the outside of the wall 128, at the bottom. The disc 160 is thus prevented from turning, and the nose of the pawl 162 is lifted clear of the ratchet, as shown in Figure 19. Upon the operation of start magnet 168, the armature 167 is pulled clear of the extensions 165 and 166, thus releasing the pawl 162. The armature 167 at the same time releases the operating plunger of a sealed-in, snap-action contact switch 169 mounted just above it, thereby causing the closure of the motor circuit and starting the drive gear 139. The pawl 162 drops into the first one of the slots in the ratchet with which it may be or becomes aligned, following its release by the armature 167, so that the disc 160, the gear 161, and the shaft 158 begin to rotate together, in a clockwise direction as seen from the left side of the machine.

Also revolving with the shaft 158 are: an ink ribbon cam 170, shown in outline in Figure 18 in its normal position as seen from the left; a pair of print cams 171, shown in outline in Figure 17; a pressure cam 172, shown in outline in Figure 16; and a pair of knife cams 173 and 174, shown in outline by solid and dotted lines in Figure 15. The purpose of the pressure cam is to permit quick release of the printing pressure through sharp points on the print cams, in order to provide time for the feeding and cutting off of the ticket. The cam 172 does this by picking up pressure from a spring-type pressure cylinder 175 mounted nearby on the inside face of the wall 129 (Fig. 11), and then gradually releasing it to prevent back lash through the gear train.

The knife mechanism, shown in detail in Figures 14 and 15, consists of a knife blade 176 pivotally connected to a heavy post 177 having an enlarged head 178, and which screws into the wall 129. The knife blade 176 is riveted at 180 to an arm 181, which is rigidly secured to a sleeve 182 rotatably mounted on the post 177. Also rigidly secured to the sleeve 182, at its outer end, is a rocker arm 183 controlled by the cams 173 and 174 through cam follower rollers 184 and 185 on the arm 183. The double action of the cams 173 and 174 on the rocker arm 183, gives a positive reciprocating motion to the blade 176 which starts to move slowly downward shortly after the shaft 158 has begun its rotation, and starts back up quickly on its cutting stroke, just before the completion of rotation. A sheet metal guard 186, open at top and bottom, mounted on the outside of the wall 129 just below the knife (see Figs. 11 and 13) serves to catch most of the paper dust resulting from the cutting operation, and tends to keep it out of the gearing.

The driven gear 161, in addition to driving the shaft 158, also drives the large gear 187 (Figs. 10 and 13), which is rigidly secured to the shaft 82 rotatably mounted in bearings in the walls 128 and 129. The shaft 82 carries the counter cam 81 mounted thereon, a short distance inside of the wall 128 (Figs. 1, 3 and 10), and also drives a bevel gear 190 mounted on its right hand end, which projects a short distance beyond the wall 128. The bevel gear 190 in turn drives a second bevel gear 191 rigidly connected to a cam shaft 192, rotatably mounted in a horizontal position across the right side of the printing unit in side brackets 193 mounted on the outer face of the wall 128.

Figure 12:
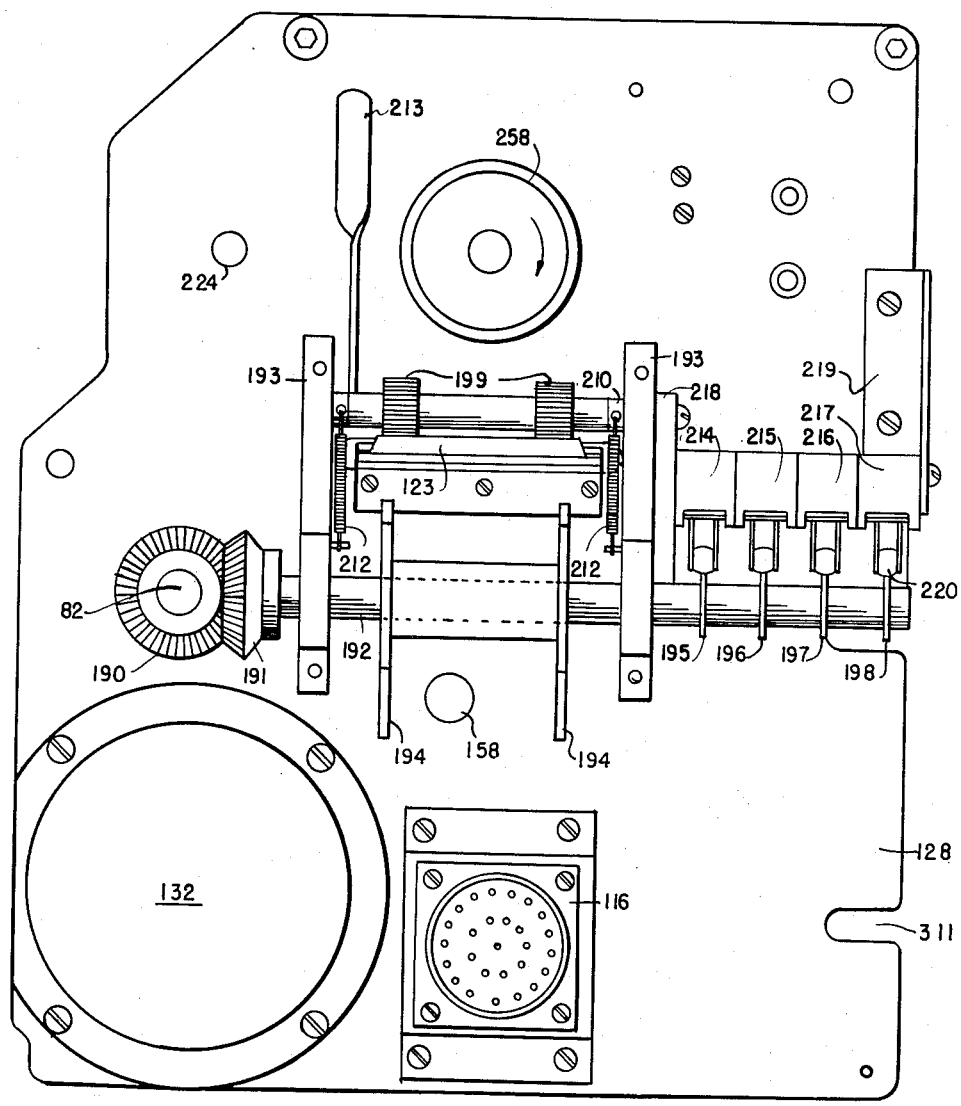
Figures 12 and 13 show right and left end views respectively, of the printing unit, Figure 12 being the paper-feeding end and Figure 13 the ticket-chute end.

Rigidly connected to the shaft 192 and thus revolving therewith are a group of cams best seen in Figure 12 and in Figures 21 to 26. These comprise: a pair of knurled paper-feed cams 194, shown in outline in normal position in Figure 22; a bet-relay-lockup cam 195, shown in outline in Figure 23; a select-key-release cam 196, shown in outline in Figure 24; a paper-check cam 197 shown in outline in Figure 25; and a motor-circuit-lockup cam 198, shown in outline in Figure 26.

The paper feed cams 194 are mounted on the shaft just below the paper entrance chute 123 in such a way that shortly after these cams have rotated through some 190 degrees of arc, or as soon as the printing operation has been completed, the knurled wings of these cams, projecting through slots on the under side of the entrance chute, engage the paper therein, and feed it forward the length of one ticket. A corresponding downward pressure is exerted on the paper by a pair of knurled idler rollers 199 which project downward through an opening in the top of the chute. The rollers 199 are rotatably mounted on a rocking carriage 210, pivoted at 211 in the side brackets 193 (Figs. 10 and 12). The idler wheels 199 are normally held down against the paper by the tension of two coiled springs 212, while a handle 213, rigidly connected to the carriage 210 at the pivotal point thereof, permits raising the rollers 199 manually, to facilitate insertion of the paper into the entrance chute when starting a new roll. The paper is then pushed through the entrance chute into a guide on top of the printing platen until it is stopped at the wall 129 by the knife blade which normally blocks the passage into the ticket exit chute.

Just above the cams 195, 196, 197 and 198 are four sealed-in, snap-action contact switches 214, 215, 216 and 217, rigidly mounted between two brackets 218 and 219, the former secured to the right hand end bracket 193 and the latter to the wall 128. Each of these contact switches is provided with an operating lever terminating in a small roller 220, each of which rides on the associated cam for the control of a make or break contact inside the switch, the exact functions of which will be described later in connection with the circuit operation.

The gear 187, in addition to driving the shafts 82 and 192, also meshes with and drives a smaller speed changer gear 221, rotatably mounted on a short shaft 222 (Fig. 10) rigidly secured to the wall 129. The gear 221 in turn, drives a still smaller gear 223 rigidly secured to a shaft 224 rotatably mounted in suitable bearings in the walls 128 and 129. (Figs. 1 and 10.) Mounted on the right hand end of the shaft 224, just inside the wall 128, is a friction clutch, comprising a gear 225, an oiled felt disc 226, a metal disc 227, and a cup shaped spring 228 suitably compressed between two locking collars rigidly secured to the shaft by means of set screws. Thus under normal conditions, rotation of the shaft 224 will drive the gear 225. Furthermore, the gear ratios are such that while the cam shafts 158, 82, and 192 will all make one revolution for each operating cycle of the machine, the shaft 224 will make approximately 2⅓ revolutions.

Meshed with the gear 225 of the friction clutch and to the rear thereof (see Fig. 1) in the upper central portion of the printing unit, is a gear 229. Rigidly secured to the gear 229 is a toothed wheel 230 (Figs. 10 and 27) to which is rigidly secured in turn the runner-number type-wheel 231. Rigidly secured to the other side of the gear 229 but electrically insulated therefrom, is a contact brush or wiper 232 and a slip ring 233 (Fig. 1), the complete assembly being rigidly secured in turn to a sleeve 234 (Fig. 27) freely rotatable about a shaft 235 mounted in bearings in the walls 128 and 129, so that whenever the gear 229 rotates, the toothed wheel 230, the runner number type wheel, and the wiper 232, all rotate with it, in a clockwise direction. The brush 232 is arranged to wipe over a flat disc-type commutator 236 (Fig. 10) mounted on the inner face of the wall 128 around the shaft 235, and insulated from both wall and shaft. The face of the commutator is provided with 13 insulated metallic segments suitably wired to a terminal block, not shown, and the circuit to the brush is brought from an insulated terminal post 237 (Fig. 1) mounted on the wall 128, by means of a resilient metallic rod 238 which rides in a groove cut around the periphery of the slip ring 233 which is in electrical contact with the brush 232.

Figure 11:
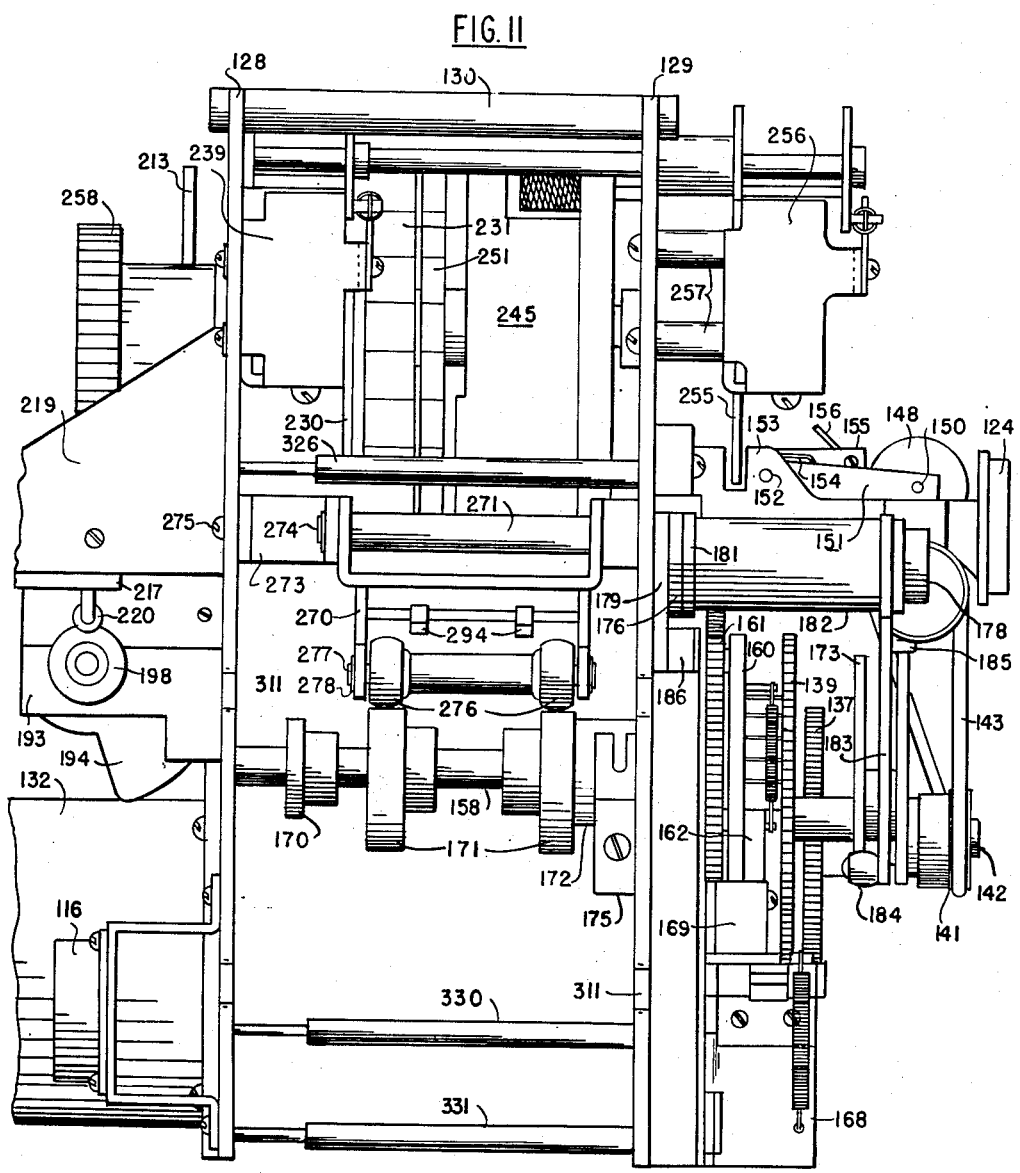

From the terminal post 237, the brush circuit goes to a stop magnet 239 mounted nearby on the inner side of the wall 128 (Figs. 1, 11 and 27). The stop magnet 239 is provided with a long armature 240 (Fig. 27), pivoted at 241, and equipped with a fixed restoring spring 242 and an adjustable restoring spring 243 mounted on an angle bracket 209 attached to the wall 128. When the brush 232 reaches a segment in the commutator marked with potential by an operated select key, the stop magnet 239 is energized, in a manner to be more fully described later in connection with the circuits, and pulls its armature 240 down against the toothed wheel 230, between two of the thirteen teeth thereon, which correspond to the thirteen type faces of the runner-number type wheel. The disc 230 continues to rotate however, until the face of the next tooth engages the inner face of the hook 244 on the end of the armature 240, when it stops, with the selected printing face of the runner wheel 231 in proper printing alignment with the printing platen. During the time that the disc 230 is thus held by the stop magnet, the gear 225 slips on its friction plate, but as soon as the printing operation has taken place, the stop magnet is released, and the gear 225 and the runner wheel assembly resume their rotation.

Also mounted on the shaft 235, just inside of the wall 129, is a miscellaneous-data type-member 245 (Figs. 1, 10 and 11) which is also freely rotatable about the shaft 235. It is normally held in the upright position as shown however, with the type faces down, in printing alignment with the printing platen, by a round nosed retractile plunger 246, the tip of which is normally spring pressed into a small hole in the wall 129. A similar hole is provided below the shaft for holding the type faces in an inverted position 180 degrees removed from the printing position. The plunger 246 is retracted by means of a knurled handle 247 (Fig. 10), which then permits ready reversal of the member manually whenever it becomes necessary to change the date, or the code word, which are printed by this member.

On the lower or type-face end of the member 245, nearest the wall 129 is a set of manually rotatable date wheels 248 (Fig. 10) which tend to remain in their last operated position by friction. The code word is formed on a thin typemetal plate made like a V with a flattened base, which is slidable in grooves 249 cut in the member 245, and locked in place by a spring pressed sliding door 250. When the door 250 is pushed back out of the way, the old code plate is readily slipped out of the slots and a new code word inserted. On either side of the code word are other type faces, permanently secured, representing the track name, and the denomination of the tickets to be issued by this machine.

Figure 13:
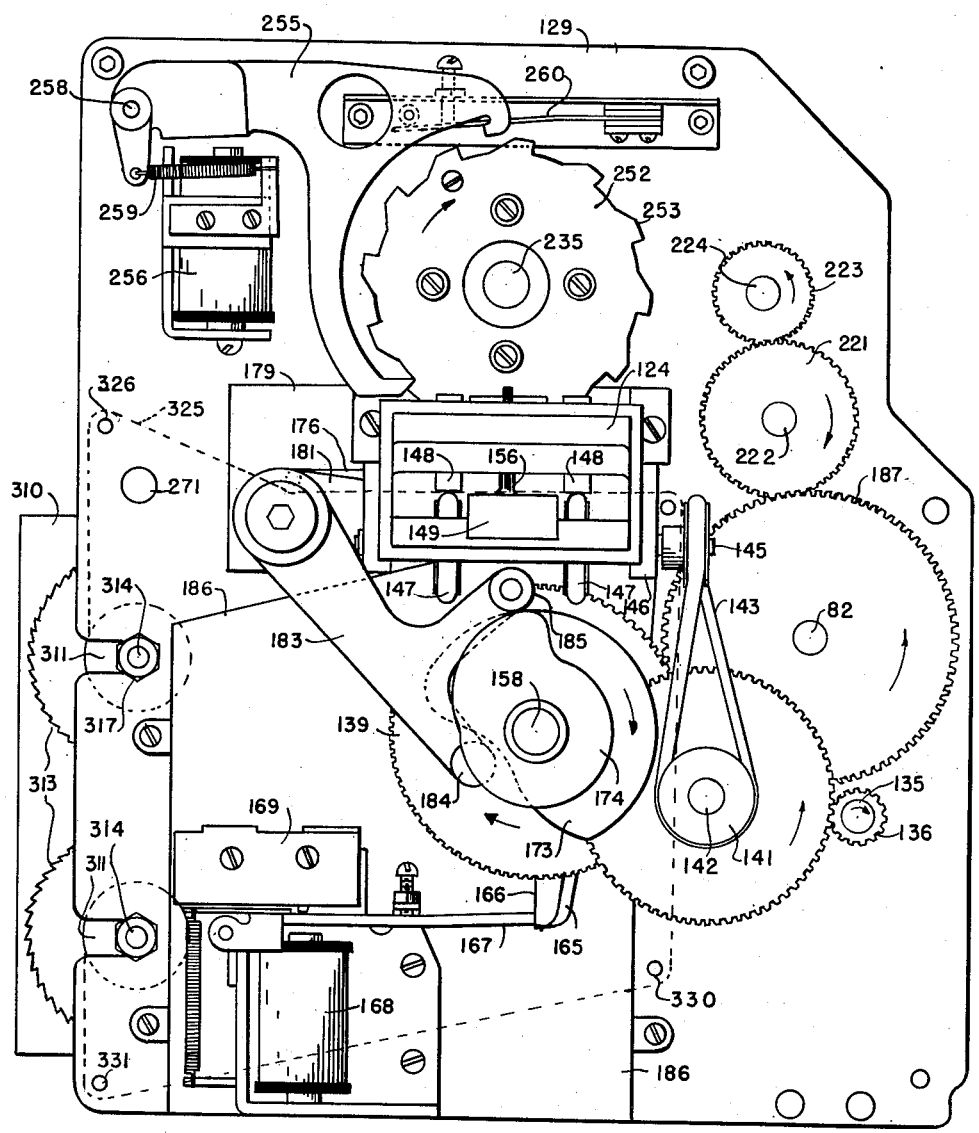

Rigidly attached to the approximate center of the shaft 235, between the runner number wheel and the miscellaneous data member, is the race number type wheel 251. Rigidly attached to the left end of the shaft 235, beyond the wall 129, is a toothed disc 252 (Figs. 10 and 13) similar to the disc 230 on the runner number wheel, and having a tooth 253 corresponding to each printing face of the race wheel. A powerful clock spring, not shown, contained in a cylindrical housing 254, mounted on the wall 129 between the disc and the wall (Fig. 10), tends to drive the disc 252 and the race number wheel 251 in a clockwise direction, with respect to the exit side of the machine, as shown in Figure 13.

Rotation of the disc 252 is normally prevented however, by an escapement 255 which is also the armature of a race-wheel stepping magnet 256, mounted on the wall 129 by means of spacer posts 257 (Fig. 11). The armature 255, which is pivoted at 258, is normally held in the position shown in Figure 13, by a fixed coiled spring 259 and an adjustable flat spring 260, the arrangement being similar to that provided for the runner-wheel-stop-magnet armature, in this respect. Upon the energization of the race change magnet 256 the armature 255 is pulled downward sharply, causing the upper jaw of the escapement to engage the rim of the disc, between two of the teeth thereof, and causing the lower jaw of the escapement to become disengaged. The disc 252, the shaft 235, and the race wheel 251 are thereupon rotated by the previously mentioned clock spring, until stopped by the upper jaw of the escapement. And upon the release of the magnet 256, the lower jaw of the escapement is again brought into engagement with the rim of the disc between the next two teeth on that side of the disc, while the upper jaw moves again into the clear. The disc 252 thereupon rotates further until stopped by the lower jaw of the escapement. In this manner, the race number wheel is advanced one half step upon the energization of magnet 256, and one half step upon its de-energization, with the lower jaw of the escapement serving to maintain the successive type faces of the race wheel in correct printing alignment, as the wheel is advanced from position to position.

On the right hand end of the shaft 235, beyond the wall 128, is a large knurled knob 258, rigidly secured to the shaft, and by means of which the race wheel is manually reset to its starting position at the start of each day's operations. This is done by turning the knob 258 in a clockwise direction with respect to the outer face of the wall 128. This rotates the race wheel and the toothed disc 252 anti-clockwise with respect to the outer face of the wall 229, with the jaws of the armature 255 (Fig. 13) riding freely over the sloping rear edges of the teeth 253, until the starting or "blank" position is reached, when a stop 259 (Fig. 10) mounted on the outside of the wall 129, engages a stop on the disc 252 and prevents further movement. Turning of the knob 258 also winds up the previously mentioned clock spring, thereby renewing the rotative tension on the shaft 235, which is however, again prevented from turning, as before, by the armature 255.

The printing platen, which is shown in detail in Figures 28 to 32 inclusive, as previously stated, is also shown in Figure 10 as seen from the front, with the ink ribbon removed and several cross members broken away, and in Figure 11 as seen from the rear, with the ink ribbon feed mechanism completely removed, to expose the pivoted end of the platen, which is normally concealed from view by the ink ribbon, at both front and rear.

As shown in Figures 28 and 29, the printing platen consists of a rocking carriage 270 pivoted about a spindle 271 secured at one end in a hole in the wall 129 by a retaining ring 272, and at the other end in a hole in a U bracket 273 by a similar retaining ring 274, the bracket 273 being rigidly attached to the wall 128 by mounting screws not shown. On the under side of the carriage 270 near the free front end, are two rollers 276 rotatably mounted on a shaft 277 secured in downturned side pieces on the carriage 270 by retaining rings 278 (Fig. 30). These rollers are normally held down against the print cams 171 by a pair of coiled springs 279, the upper ends of which are connected to the front end of the carriage 270 and the bottom ends to a rod 280 anchored in the walls 128 and 129 and shown broken off in Figure 10.

Mounted on top of the rocking carriage 270 at the free end, is the printing platen proper, consisting of a flat metallic base plate 281 carrying mounted transversely across its top, a hard rubber block 282 in the center, and two metallic blocks 283 of the same thickness, on either side thereof. Just above these and held in spaced relation therewith by thin narrow side strips 284, is a flat metallic paper guide plate 285 having the central portion cut away, and the entering and exit sides turned up as shown, the direction of feed being indicated by the arrow 286. The rubber bed plate 282 is cemented to the base plate 281, but the rest of the assembly is held together by rivets 287 along the edges. The printing platen assembly is fastened to the carriage 270 by means of four screws 288 which screw into the base plate 281 and the side blocks 283, through hollow metallic spacer tubes 289. These spacer tubes are a sliding fit in holes in the top of the carriage 270, and are provided with shoulders on the underside to limit the amount of sliding, and to hold the assemblies together.

Also mounted on the underside of the carriage 270 along the section line EE which is also the center line of the platen assembly, are a pair of metallic cylinders 290 open at both ends, and staked in place in holes in the top of the carriage. Inside each cylinder is a hollow sliding piston or plunger 291 open only at the top (Fig. 31) and containing a powerful coiled spring 292, the upper end of which engages a knob 293 riveted to the underside of the base plate 281 of the platen assembly. The pistons 291 are held in place in the cylinders 290 by a pair of levers 294 pivoted at the center on a spindle 295 anchored in the downturned sides of the carriage, and which are pressed upward against the underside of the plungers, by means of a pair of tension adjusting screws 296 mounted in the top of the carriage just above the rear end of the levers 294. It is thus seen that the platen assembly is resiliently mounted on the carriage 170 in such a way that the angle of its upper surface is self-adjustable to varying pressures of the various type surfaces, while at the same time the overall printing pressure may be changed at will, by changing the setting of the adjustment screws 296.

Mounted on the underside of the platen assembly, near the paper exit side, are a pair of paper-check metallic cylinders 297 which pass upward through the side blocks 283 inside a non-conducting tube 296 which insulates them from the block (Fig. 32). Inside of these cylinders, which are open at the upper end, is a coiled spring 299 supporting a small metal plunger 300. The plunger 300 in turn, presses a small steel ball 301 against the underside of the edge of the paper guide 285 in the path of the ticket paper, which normally prevents contact between the two. The cylinders 297 are held in place by a cross member 302 which forms part of a terminal assembly 303 (Fig. 29) secured to the underside of the base plate 281. Holes in the ends of the cross member 302 slip over the bottom of the cylinders 297 and press upward against shoulders on the outside of the cylinders, which holds them tightly against the platen, and at the same time completes the wired side of the platen paper-check circuit leading to the terminal 304. The other side of the circuit, including the paper guide 285, is grounded to the frame of the machine.

The ink - ribbon - feed - and - reversing mechanism, shown only in Figures 33, 34 and 35, is mounted on a small back plate 310, so as to form a single assembly which is inserted between the walls 128 and 129 from the rear, and anchored in slots 311 in the lower rear edge of these walls (see Figs. 12 and 13), by means of posts 314, which form the shafts for the ribbon reels.

The ribbon reels, which are mounted one above the other on the plate 310 as shown, consist of a hollow core 312 (Fig. 34) secured to end pieces 313, the inner of which are made in the form of ratchet wheels. The reels are slipped on over the posts 314, which serve as shafts. These posts are threaded at each end, and have an enlarged section 315 at one end which serves as an abutment or spacer. Nuts 316 and 317 are assembled on the threaded ends of the posts 314, with coiled springs 318 under the nuts 317. To place the assembly in the machine it is only necessary to push the rods 314 into the slots 311 and tighten the nuts 316, which hold the assembly. The nuts 317 are then tightened as necessary, the compression of the springs 318 serving to press the reels back against the abutments 315 without binding, and at the same time lock the nuts 317.

Pivotally mounted on the posts 314, between the ribbon reels and the back plate 310, are a ribbon guide bracket 319 and a ribbon reversing arm 320. The brackets 319 are normally held against stops 321 in the position shown in Figure 33, by coiled springs 322, while the reversing arms 320 are normally held against an upturned edge 323 of the brackets 319 by coiled springs 324. The ink ribbon, designated by the numeral 325, after leaving the upper reel, passes over a horizontal guide rod 326 anchored in the walls 128 and 129, then threads through a slot 327 in the upper guide bracket 319, passes under a rod 328 and between the printing platen and the type faces already described, loops around other guide rods 329 and 330, threads through the slot in the lower guide bracket 319, passes under a final guide rod 331, and thence to the lower reel. The location of the ink ribbon is also indicated in Figure 13, by means of a dotted line.

Also mounted on the back plate 310, at the front end, is a rocking pawl-carrier bracket 332 pivotally mounted on a post 333 rigidly secured to the base plate, near the bottom edge. It is normally spring pressed against the ink ribbon cam 170 by a coiled spring 334, the point of contact being a roller 335 mounted on the front upper corner of the carriage 332, which is prevented from moving forward beyond the normal position shown in Figure 33, by the stop 336. Pivotally mounted on the carrier bracket 332 by means of a post 337, is a long ink-ribbon-feed-pawl 338 whose tip projects between the adjacent edges of the ribbon reel ratchets 313. Also associated with the pawl carrier 332 is a U shaped toggle anchor arm 339 pivoted at its lower closed end on a post 340 mounted on the base plate 310. The underside of the open end of the arm 339 is loosely connected by a large-head rivet 341 to a link 342 which is in turn connected to the post 337 on the feed pawl carrier, so that the arm 339 is caused to follow the movements of the carrier. The upperside of the open end of the anchor arm 339 is also linked to the rear end of the feed pawl 338 by a U-shaped toggle spring 343, which tends to hold the right-angled working tip of the pawl in engagement with the teeth of one or the other of the ratchets 313, which are indicated in Figure 33.

Retrograde movement of the reels is prevented by a pair of detent arms 344 which are side arms of a U-shaped detent toggle bracket 345 pivotally mounted on the base plate 310 by means of a post 346. Also pivotally mounted on the post 346 between the jaws of the bracket 345 is a small U-shaped toggle-anchor bracket 347, which is also linked to the tip of the upper limb of the bracket 345 by a U-shaped toggle spring 348. The upper open end of the anchor bracket 347 is also provided with two upturned side ears 349, which normally stand in the path of any side movement of the feed pawl 338, which has been broken away in Figure 33 to better show the details of these parts.

In operation, the cam 170 makes one complete revolution for each operating cycle of the machine, and as it rotates, it obviously forces the carriage 332 and the pawl 338 to the left, with respect to the positions shown in Figure 33. The pawl 338 is thus caused to ride over the sloped trailing edges of the teeth of the ribbon reel ratchet with which it is engaged at the time, passing successively over several teeth in this manner. Shortly after the mid-point of the cycle, following the completion of the printing operation, the carriage 332 and the pawl 338 start in the reverse direction, back to their original position, the pawl tip now engaging the working face of a tooth to move the reel, and advance the ribbon a short distance. Thus in Figure 33, the lower reel would be moved in a clockwise direction, while the pull of the ribbon being wound on the lower spool would cause the upper reel also to move in a clockwise direction to unwind an equivalent amount of ribbon.

When the ribbon is almost completely unwound from the upper reel, an eyelet 350 in the ribbon, near the end thereof, is moved against the slot 327 of the upper guide bracket 319. Since the eyelet is too large to pass through the slot, the bracket 319 is moved slowly in a clockwise direction, and pulls the ribbon reversing arm 320 along with it until the right-angled tip of the arm 320 is finally moved into the path of a shoulder 351 on the pawl. On the next operation of the machine therefore, the shoulder 351 will strike the arm 320, thereby causing the pawl 338 to swing in a clockwise direction about its pivot 337. When the rear end of the pawl passes below the center line of the link 342, the toggle spring 343 comes into action to complete the movement by pulling the rear end of the pawl sharply downward, and forcing the working tip thereof against the ratchet teeth of the upper reel. During this movement, the upper side of the pawl strikes the upper ear 349 of the anchor bracket 347, moving the latter also upward. When the center line of the anchor bracket rises above the center line of the detent toggle bracket 345, the toggle spring 348 comes into action to pull the tip of the detent bracket sharply downward, thus bringing the upper detent 344 into engagement with the upper reel, and disengaging the lower detent from the lower reel. On subsequent operations of the machine, the cam 170 and the pawl 338 will operate the upper reel in the same manner as described for the lower reel, but in an anticlockwise direction, and thus gradually re-wind the ribbon thereon. When the lower reel in turn, is almost completely unwound, a rivet near the lower end of the ribbon strikes the slot in the lower guide bracket 319 to swing the tip of the lower ribbon reversing arm into the path of the lower shoulder 351 of the pawl 338, causing the latter to be restored to its original position, in a similar manner.

With reference to the circuit details, the complete circuit of the ticket issuing machine is shown, as previously indicated, in Figures 36 and 37, together with certain mechanical parts already described, and which have been given the same numbers as given to these parts on the mechanical drawings. Thus, Figure 36 shows the various control magnets and control cams of the printing unit, together with the commutator, the paper roll, the paper-check and cover-locking contacts, and the driving motor. Figure 37, in the upper part, shows two of the twelve runner keys, the test key, the key release magnet, the key locking bar, and the five control relays, including a "bet" relay 510 operated from the runner keys, an "acknowledgement" relay 520 operated from the totalizator in the control room, a "start" relay 530 operated by the bet and acknowledgement relays, a "lock" relay 540 operable at will from the control room, and a "paper check" relay 550. In the lower part of Figure 37, below the dotted line 594, is shown a small part of the equipment in the control room, to facilitate the understanding of the operation of the ticket issuing machine. This includes start and adder electromagnets for the #1 runner adding machine for the win pool, designated 570 and 575 respectively, start and adder electromagnets 580 and 585 in the total adder for the win pool, and a collector pickup relay 590, which serves to pick up bets from this and other designated ticket machines and pass them to the proper adders. The details of the totalisator circuits are not involved in this invention, and it will suffice to say that there is one total adder for each pool, one runner adder for each runner and each pool, and a collector for each pool.

To prepare the ticket issuing machines for operation, an authorized person in the control room closes a switch such as indicated at 582 in Figure 37, which connects negative battery to the upper winding of the bet relays of all of the ticket machines, collectively or individually, in any convenient manner, the general idea only, being shown in the drawing, however. The operation of this switch may also give a signal, in any convenient manner, that the machines are ready for operation.

If now, in the machine illustrated, the #1 runner key is operated, the key contacts 500 and 501 are closed, and the locking bar 49 is moved to the right, in the manner previously described, to open contacts 57 and close contacts 57a, which open the circuit to the lockup relay 540 and prepare a locking circuit for the key release magnet, respectively. The movement of the bar 49 also trips the bell crank 59, which causes closure of the contacts 60 associated therewith. The make contacts 502, not previously shown due to being on the rear side of the key-release magnet, are not affected, since these contacts close only when the magnet 31 is operated.

Upon the closing of break contacts 60, a circuit is closed to the bet relay 510 as follows: ground from contacts 60, through break contacts 552, 542 and 537, and the upper winding of relay 510 to supervised battery. Relay 510 operates over this circuit, and at make contacts 514 closes a locking circuit to its own lower winding, from break contacts 535 on the start relay, and from the cam controlled break contacts 214 on the printing unit. Bet relay 510 also, at make contacts 513, assuming the pickup relay in the associated collector 593 to be operated, completes a circuit for the start relays of the #1 runner adder 577 and the total adder 581 as follows: ground through start relay 570, make contacts 500 of the operated runner key, make contacts 513, break contacts 521 and 533, make contacts 592 and the winding of start relay 580 to negative battery. The start relays 570 and 580 operate in series over this circuit, and cause both the runner and total adders to pick up the amount of the ticket. This results in the operation of the electromagnets 575 and 585 in the adders which in turn close a circuit to the acknowledgement relay 520 as follows: ground from make contacts 576 in the runner adder, make contacts 586 and 591, break contacts 538 and 524, and the winding of relay 520 to battery.

The acknowledgement relay operates over this circuit, and at make contacts 523 locks direct to ground at the closed start contacts 60, contacts 524 opening at the same time, to break the original circuit to this relay. Acknowledgement relay 520 also, at break contacts 521 opens the previously traced adder start circuit, and at make contacts 522 extends the ground from contacts 60 through 515 to start relay 530. Start relay 530 thereupon operates, and at make contacts 536 locks direct to contacts 60, independently of the bet and acknowledgement relays. Start relay 530 also, at break contacts 531 opens the circuit to the paper check relay, at make contacts 532 extends ground from make contacts 512 to the start magnet 168 in the printing unit, at break contacts 533 opens another point in the adder start circuit, and at make contacts 534 grounds the #1 segment of the commutator 236, by way of make contacts 501 on the operated #1 runner key. Start relay 530 further, at break contacts 535 disconnects one of the locking grounds from the bet relay, at break contacts 537 opens the operate circuit to the bet relay now held only from contacts 214, and at break contacts 538 and 539 opens both the operate and locking circuits to acknowledgement relay 520 which immediately restores.

The start magnet 168 in the printing unit operates, upon the closure of its circuit and pulls down its armature 167, thereby tripping the printing unit's main drive clutch in the manner previously described, and at the same time closing contacts 169 to start the motor 132. Immediately after the motor starts, cam 198 closes the contacts 217 thereby closing a lockup circuit to the motor which is independent of the start contacts 169. At approximately the same time, or immediately thereafter, the cam 195 opens the contacts 214, thereby unlocking and releasing the bet relay. Bet relay 510 upon releasing, at make contacts 514 opens another point in its locking circuit, and at make contacts 512 opens the circuit to start magnet 168. The start magnet accordingly releases, opening start contacts 169, and preparing the reengagement of the pawl and ratchet clutch previously described. This clutch has not been shown in the circuit.

The runner type wheel also starts rotating, in the manner already described, as soon as the motor starts, and drives the wiper 232 across the face of the commutator 236 which is shown extended, in symbolic form in Figure 36, rather than in its true circular shape, to facilitate drawing. Since the runner wheel has no "home" or start position, but may stop anywhere, it and the wiper 232 start from wherever they happen to be, and rotate until the wiper strikes the marked segment of the commutator, which is the #1 segment in this case. When this occurs, the stop magnet 239 in the print unit operates, from the ground at contacts 534, and stops the runner wheel, in the manner previously explained. The speed of travel of the runner wheel is such that it would make somewhat more than one complete revolution, if unimpeded, in slightly less than one half of the time required for the full operating cycle.

The printing of the ticket occurs, at approximately the mid-point of the cycle, as previously described, the actual duration of the printing pressure being only about 10 degrees of arc on the print cams. At approximately the same time or shortly thereafter, the cam 196 in Figure 36 closes contacts 215 and cause the operation of the key release magnet 31. The armature 62 of the key release magnet thereupon pushes the bell crank lever 59 out of the way of the locking bar 49 which thereupon returns to its normal position. The armature 62 at the same time opens contacts 60 and closes contacts 502. Contacts 60 thereupon remove ground from the bet relay pull-up circuit, and unlock and release start relay 530, while contacts 502 lock up the key release magnet, from ground at contacts 57a. This latter circuit insures that the magnet 31 will remain operated until the locking bar has been completely restored to its normal position. The restoration of the locking bar of course releases the operated select key, and restores the contacts 57 and 57a to their normal position. The opening of contacts 57a unlocks the key release magnet, and since the operation of cam contacts 215 was only momentary, the magnet 31 restores and opens contacts 502. Since the locking bar is now also restored, contacts 60 remain open.

The release of the operated runner key and the start relay removes marking ground from the #1 segment of the commutator, whereupon the stop magnet 239 is released, and the runner-number type-wheel resumes rotation. If another runner key is now operated, the bet, acknowledgement, and start relays will re-operate, and again pull up the start magnet 168, so as to start the printing unit off on a new cycle, without stopping, as soon as the current cycle has been completed.

Meanwhile, the knife cams have moved the knife blade downward, out of the path of the ticket, and, as soon as the printing operation has been completed and the printing pressure released, the paper feed cams engage and advance the paper the length of one ticket, in the manner previously described. This takes about ⅓ of the operating cycle which will then be approximately ⅚ completed, and moves the printed ticket past the cutting knife and into the exit chute. As soon as the feeding operation is completed, the knife blade is moved quickly upward by its cams, and severs the printed ticket, just before the completion of the operating cycle. At approximately the same time, the cam 198 opens the motor circuit, and the motor coasts to a stop, assuming of course, that no other runner key has yet been operated. The armature 167 on the now normal start magnet 168 disengages the main clutch and stops rotation of the various cam shafts, independently of the motor, the final revolutions of which are utilized to eject the severed ticket from the exit chute, by means of the belt-driven rubber shod rollers previously described.

The printing of a test ticket requires only the operation of the test key in the keyset unit, instead of a runner key. As previously indicated, the operation of this key is not recorded on the counters of the keyset. Neither is it registered on the adding machines in the control room, nor does it cause the operation of the bet and acknowledgement relays, as will be seen. Even should the bet relay operate however, it will not affect the operation.

Upon the operation of the test key, the locking bar 49 is moved to the right in the usual way and locks, closing contacts 60 and 57a and opening contacts 57. At the same time, make contacts 503 on the test key place a ground marking on the "Test" segment of the commutator 236, while contacts 504 close a circuit to the start relay 530, from ground at contacts 60, through contacts 552, 542 and 504 to the relay 530. The start relay operates quickly, and at break contacts 537 disconnects the bet relay. The start relay also, at make contacts 536 locks itself operated to contacts 60, and at make contacts 532 operates the start magnet 168 from ground at make contacts 505 on the test key. The printing unit now starts and goes through its regular cycle of operations to print and issue a ticket, the only difference being that the stop magnet 239 will now stop the runner wheel when the wiper 232 reaches the test segment of the commutator, so that the word "Test" will be printed on the ticket in place of the usual runner number.

Should it be desired to lock out this machine from the control room, without affecting any other ticket issuing machine, this may be done, by operating a key such as 578 in the control room. If the keyset is normal at the time, ground from the key 578 passing through break contacts 57, causes the operation of lock relay 540. Relay 540 thereupon at make contacts 541 locks itself direct to contacts 578 independently of contacts 57, at contacts 542 opens the circuit to the bet relay to prevent its operation from contacts 60, and at make contacts 543 prepares a circuit to the key release magnet. If a key is now operated, on this machine, the locking bar 49 will be moved right as before. Now however, the ground from contacts 60, instead of operating bet relay 510 as before, to start the printing unit, passes through break contacts 516 of this relay and make contacts 543, and operates the key release magnet 31. This causes the immediate release of the key, thus making the machine, in effect, inoperative.

The paper-check relay 550, which has the same effect in preventing operation of the machine as the lock relay, may be operated from any of the three paper checks previously described, and which are all connected in parallel, as indicated in Figure 36. Thus, if the paper on the paper reel reaches the point of exhaustion, the contact 122 will receive ground through the frame of the machine and will close a circuit through break contacts 404 of the paper check release key, break contacts 511 and 531, the winding of relay 550 and the resistor 554 to negative battery. Similarly, the absence of paper in printing position in the paper guide of the printing platen, for any reason at any time, will cause the rolling ball contacts 301 to pass frame ground from the guide, direct to contacts 511 and 531 and the paper check relay. Or again, if there is no ticket under the brush 156 in the exit chute at a particular point of the feeding cycle, as determined by the setting of the cam 197 and the resultant momentary closing of the contacts 216, or if the ticket forces the brush against the roof of the chute, in the manner previously described, the brush 156 will in turn pass frame ground to relay 550, by way of contacts 216, 511 and 531. Cam 197 closes contacts 216 only briefly, just before the ticket cutting operation.

When the paper check relay 550 is operated, from any of these sources, the paper check lamp 23, which is connected in parallel therewith, also lights, as a warning to the operator. Relay 550, at make contacts 551 locks itself operated, at break contacts 552 opens the operate circuit to the bet relay, and at make contacts 553 prepares a circuit for the key release magnet 31, the action being similar, as stated, to that of the lock relay.

The operator, on noting the locked condition of the machine, together with the lighted condition of the paper check lamp, will call a trouble man, although he may first if desired determine the condition of the paper reel by pressing the trouble key 22, and looking through the window in the cover, the closure of the key lighting the lamp 127 on the inside of the housing, from battery through the upper contacts 507. The trouble man will then clear the trouble and place the machine back in service. As soon as he opens the cover, the cover locking bar 9 permits the alarm contacts 16 to close, and light the warning lamp 595 in the control room, as an indication that this particular machine is open. An audible signal may be operated also, if desired, but this feature has not been shown.

If the trouble is not immediately apparent, the source of the trouble may be determined by operating the paper check release key 402 momentarily. This key, as well as a key release key 400, is mounted on a small bracket, not shown, on the printing unit, and is thus accessible only when the cover is open. Upon the operation of the paper check release key 402, contacts 404 thereon open and contacts 403 close. Contacts 403 close a shunting circuit for relay 550 from ground at contacts 551 through contacts 531, 511 and 403 to the resistor 554, and, if the trouble is in the paper guide, from ground on contacts 301 through contacts 403, as well. Relay 550 thereupon releases. If the stoppage was due to either the paper reel or the exit chute paper checks, the paper check lamp 23 will also be extinguished, since contacts 404, 216 and 551 will be open. And if the lamp 23 re-lights upon the release of the paper check key, the trouble is in the paper reel, since ground will now be extended again to relay 550 and lamp 23 through contacts 404; but if it remains dark, the trouble is in the exit chute, since contacts 216 will be open again. On the other hand, if the paper check relay releases upon the operation of the key, but the lamp remains lighted, the trouble is in the paper guide in the platen, with ground fed from the contacts 301, as will be obvious. If the trouble is due to the exhaustion of the supply of paper on the reel, the trouble man may run a test ticket, or a regular ticket if necessary, from the remaining paper, by holding the key 402 operated, to keep the paper check relay de-energized, and then pressing the proper key in the keyset.

In case of other trouble, as where operation of a runner key fails to start the machine, it may be determined whether the bet and start relays have operated, either before or after the machine is opened, by pressing the trouble key 22 on the keyset unit. If the bet relay is operated at the time, ground from contacts 60 passing through make contacts 515 and contacts 508 on the trouble key will light the green bet lamp 24. And if the start relay is also operated, ground from make contacts 534 passing through contacts 509 on the trouble key will light the white start lamp 25. This permits determining quickly if the trouble is in the keyset unit or the printing unit, or possibly in the electrical connections between the two. With trouble of this nature, the trouble man may first wish to release the operated key in the keyset, which he may do, after opening the machine by operating the key-release key 400. This causes the key release magnet 31 to operate, in obvious manner.

The race wheel stepping magnet is not shown in the circuit, since its operation from the control room by a control key or other suitable means, over a direct wire connection, will be obvious.

It will also be apparent that various modifications of the arrangements shown are possible, without departing from the spirit and general scope of the invention. One such modification for example might be the elimination of the start relay by combining it with the acknowledgment relay. Another possible modification would be the complete separation of the keyset and printing units, with electromagnetic means for operating the counter operating bail.

What is claimed is:

1. In a ticket issuing machine, a plurality of cam shafts, a driving motor and a start circuit therefore, a first gear driven by said motor, a second gear, a mechanical clutch for driving the second gear from the first, a start magnet and an armature therefore, said armature controlling said start circuit and normally holding said second gear in its starting position and said clutch in its disengaged position, a group of select keys, means responsive to the operation of any one of said keys for energizing said magnet and operating said armature momentarily to free said second gear, to engage said clutch, and to close said start circuit, said driving motor responsive to the closure of said start circuit for rotating said gears, means responsive to the rotation of said gears to drive said cam shafts one revolution and first, second and third means operated by said cam shafts during said one revolution, said first means printing a number corresponding to the operated key on one of a plurality of tickets in said machine, said second means severing said one ticket from the others, and said third means ejecting said ticket.

2. In a ticket issuing machine cyclically operable from any one of a plurality of select keys for printing and issuing a ticket each cycle corresponding to the operated key, mechanical means operated by the operated key for locking said key operated and disabling the other keys, release means for restoring said mechanical means to thereby release said key and enable said other keys, a key release magnet for controlling said release means, means for completing the printing operation during the first half of the operating cycle of said machine, a cam controlled circuit for operating said release magnet near the mid-point of the operating cycle following the printing to thereby operate said release means to release the operated key and enable the other keys, means for automatically stopping said machine at the end of its operating cycle in case none of said keys is then operated, and means for causing said machine to continue on uninterruptedly past its stopping point and to issue another ticket in case another key or the same key is re-operated before said machine reaches said stopping point.

3. In a ticket issuing machine as in claim 2, a start magnet for initiating the operating cycle of said machine, contacts closed by the key locking means and by said key release magnet when in their respective operated positions, and means including said contacts for locking said release magnet in its operated position, until said key locking means has been completely restored to its normal position.

4. In a ticket issuing machine, cyclically operable means for printing and issuing one ticket each cycle, a series of keys, an acknowledgement relay, a start magnet, means operated in response to the operation of a particular key for locking said operated key in operated position and transmitting a signal to a remote register, said acknowledgement relay operated by a signal returned from said register when said first signal is accepted thereby, said start magnet operated in response to the operation of said acknowledgement relay to initiate the operation of said printing and issuing means to thereby start the ticket printing and issuing cycle, means for completing said cycle independent of said magnet and relay, and means for releasing said locked key and said magnet and relay before the completion of said cycle.

5. In a ticket issuing machine as in claim 4, a start relay operated from said acknowledgement relay and locked operated independently of said relay, and means for operating said start magnet from said start relay.

6. In a ticket issuing machine, means for printing and issuing a paper ticket, a group of interlocking select keys, a key release magnet, a first relay operable from any one of said keys to transmit a signal to a remote register, a second relay operable from said register in response to the registration of said signal thereat, to cause operation of said means to print and issue a paper ticket corresponding to the operated and locked select key, means for automatically releasing said relays and said key a substantial interval before the completion of the printing and issuing operation, a lockup relay operable from a remote point only when no key is operated to disable said first relay, and means responsive to the operation of any select key after said lockup relay is operated for operating said key release magnet to release said last operated select key immediately.

7. In a ticket issuing machine as in claim 6, a paper-check relay, means responsive to the operation of said paper check relay for also disabling said first relay, means responsive to the operation of any select key while said paper check relay is operated for also operating said key release magnet to release said last operated select key, and means for operating said paper check relay, both in case there is no paper in printing position in said machine and in case there is a low paper supply in said machine.

8. In a ticket issuing machine operable by any one of a plurality of select keys to print and issue tickets carrying the number of the operated key, a printing platen, a plurality of cam shafts, key and event number wheels carrying key and event numbers on the periphery and mounted side by side on a common shaft including inner and outer shafts one inside the other, a first electromagnet for advancing one of said inner and outer shafts and said event wheel between events independently of said key number wheel and said keys for bringing different ones of the event numbers thereon into alignment with said platen, an electric circuit independent of said keys for controlling said electromagnet, means for energizing said circuit, a clutch and a motor for simultaneously starting the rotation of the other of said inner and outer shafts and said key number wheel and said cam shafts independently of said event number wheel, a circuit for starting said motor, a second electromagnet for closing said circuit and for operating said clutch, a circuit for operating said last electromagnet in response to operation of only one of said keys, means for stopping only said other shaft and said key number wheel independently of said cam shafts, a third electromagnet for operating said last means, a circuit controlled by said operated key and said other shaft for operating said last electromagnet when the number of said operated key on said key number wheel is aligned with said platen, and means responsive to the continued rotation of said cam shafts for operating said platen to print a ticket with the numbers of the event and key number wheels aligned therewith, other means operated responsive to said continued rotation for issuing said ticket, and still other means operated automatically responsive to said continued rotation for stopping said machine.

9. In a ticket issuing machine as in claim 8, an escapement associated with said event wheel shaft for advancing said event wheel one number for each operation and release of said event wheel electromagnet, a reset handle on one end of said event wheel shaft, and means associated with said escapement for enabling said event wheel and shaft to be returned to their original starting position by simply turning said reset handle backward manually.

10. In a ticket issuing machine operable by any one of a plurality of select keys for printing and issuing tickets carrying different markings corresponding to said keys, a rotatable type wheel carrying said markings thereon, a first electromagnet operated responsive to the operation of any one of said keys for starting said machine, a clutch controlled by said electromagnet for starting the rotation of said type wheel at the beginning of the operation of said machine, a commutator controlled by said type wheel, a second electromagnet and a circuit for operating it under control of said operated key and said commutator for stopping said type wheel and commutator automatically when the marking corresponding to the operated keys is in printing position, means for automatically printing such marking on a ticket in said machine following such stoppage, means for releasing said second electromagnet following such printing operation for automatically causing a resumption of the rotation of said type wheel and commutator, means for then automatically issuing said printed ticket, and means responsive to said first releasing means for releasing said first electromagnet to stop said machine and said type wheel and commutator.

11. In a ticket issuing machine as in claim 10, a positive acting clutch controlled by said first electromagnet to start the rotation of said type wheel and commutator at the beginning of each operation of said machine, a friction clutch controlled by said second electromagnet for stopping said type wheel and commutator for printing, and automatic means including said positive clutch for stopping said type wheel and commutator again in any one of a plurality of stopping positions upon the issuance of said ticket.

12. In a ticket issuing machine as in claim 8, a miscellaneous data member mounted alongside of said number wheels on the same shaft and having a single type face on one end thereof normally aligned with said printing platen, the data from said member and said key and event numbers from said aligned number wheels being printed simultaneously on the ticket being issued in response to said operation of said platen, means enabling said data member to be manually reversed end-for-end independently of said number wheels for at times manually changing said miscellaneous data, automatic latching means for holding said member in either of its two positions, and manual means for releasing said latching means.

References Cited in the file of this patent

UNITED STATES PATENTS

| Number | Name | Date |
|---|---|---|
| 692,508 | Fischer | Feb. 4, 1902 |
| 1,562,893 | Kruse | Nov. 24, 1925 |
| 1,705,272 | Sundstrand | Mar. 12, 1929 |
| 1,796,327 | Gollnick | Mar. 17, 1931 |
| 1,829,004 | Howard | Oct. 27, 1931 |
| 1,858,813 | Wheelbager | May 17, 1932 |
| 1,886,626 | Black | Nov. 8, 1932 |
| 1,971,859 | Knutsen | Aug. 28, 1934 |
| 1,972,985 | Gardner | Sept. 11, 1934 |
| 1,983,247 | Saxby | Dec. 4, 1934 |
| 2,004,872 | Johnson | June 11, 1935 |
| 2,020,594 | Webb | Nov. 12, 1935 |
| 2,026,763 | Webb | Jan. 7, 1936 |
| 2,086,605 | Cooper | July 31, 1937 |
| 2,122,518 | Deane | July 5, 1938 |
| 2,133,865 | La Boiteaux | Oct. 18, 1938 |
| 2,135,574 | Handley | Nov. 8, 1938 |
| 2,150,761 | Craig | Mar. 14, 1939 |
| 2,157,035 | Torkelson | May 2, 1939 |
| 2,175,530 | Knutsen | Oct. 10, 1939 |
| 2,275,653 | Rast | Mar. 10, 1942 |
| 2,375,197 | Clark | May 8, 1945 |
| 2,423,953 | Stratton | July 15, 1947 |